US008627140B2

(12) United States Patent
Hattori et al.

(10) Patent No.: US 8,627,140 B2
(45) Date of Patent: Jan. 7, 2014

(54) FAILURE MANAGEMENT METHOD AND COMPUTER

(75) Inventors: Naoya Hattori, Yokohama (JP); Toshiomi Moriki, Kokubunji (JP); Yoshiko Yasuda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 353 days.

(21) Appl. No.: 13/079,155

(22) Filed: Apr. 4, 2011

(65) Prior Publication Data

US 2011/0271152 A1    Nov. 3, 2011

(30) Foreign Application Priority Data

Apr. 28, 2010 (JP) ................................. 2010-103911

(51) Int. Cl.
*G06F 11/00* (2006.01)
(52) U.S. Cl.
USPC ........................................................ 714/6.13
(58) Field of Classification Search
USPC ................................................. 714/6.13, 53
See application file for complete search history.

(56) References Cited

U.S. PATENT DOCUMENTS 3,814,919 A * 6/1974 Repton et al. ................... 714/25
5,265,227 A * 11/1993 Kohn et al. .................... 711/207
2002/0180778 A1 * 12/2002 Proudler ....................... 345/734
2010/0030975 A1 * 2/2010 Murray et al. ................ 711/154
2010/0251066 A1 * 9/2010 Radke ............................ 714/752
2010/0281202 A1 * 11/2010 Abali et al. ................... 711/103

OTHER PUBLICATIONS

IntelR 64 and IA-32 Architectures Software Developer's Manual, vol. 3A: System Programming Guide Part 1, Chapter15.6: Recovery of Uncorrected Recoverable (UCR) Errors, Jun. 2009.
Building IT Server Solutions on Intel Microarchitecture (Nehalem-EX)-based Platforms Featuring Windows Server 2008 R2 and Hyper-V. Intel Developer Forum 2009.

* cited by examiner

*Primary Examiner* — Yair Leibovich
(74) *Attorney, Agent, or Firm* — Mattingly & Malur, PC

(57) ABSTRACT

A failure management method for a computer including a processor, and a memory connected to the processor, and in which the processor containing a memory protection function, executes a first software program and a second software program monitoring the operation of the first software program, and the second software program retains error information including address information and access-related information; and the method implemented by the by the second software program includes a step for detecting the occurrence of errors in the memory; and a step for prohibiting access to the address of the memory where the error occurred, and monitoring the access state; and a step for executing the failure processing when accessing by the first software program of the address of the memory where the error occurred was detected.

10 Claims, 17 Drawing Sheets

| ERROR TYPE | VIRTUAL MACHINE NO. | GUEST ADDRESS | ERROR PAGE ADDRESS | SUBSTITUTE PAGE ADDRESS | TEMPORARY PAGE ADDRESS | Poison BITMAP | ELIMINATION BITMAP |
|---|---|---|---|---|---|---|---|
| CACHE | 2 | 0x10408000 | x10408000 | NONE | NONE | 00000001111111100...0 | 00000001111111100...0 |
| MEMORY (INDIRECT I/O) | 5 | 0x10408000 | x10408000 | NONE | NONE | 11111111000000000...0 | 1111000000000000...0 |
| MEMORY (DIRECT I/O) | 3 | a | ... | 0xC0000000 | 0xC0001000 | 0000000000000011...0 | 0000000000000000...0 |
| NORMAL | 0 | a | ... | 0xC0000000 | 0xC0001000 | 0000000000000000...0 | 0000000000000000...0 |
| ⋮ | ⋮ | ⋮ | ... | ... | ... | ... | ... |
| NORMAL | 0 | NONE | ... | NONE | NONE | 0000000000000000...0 | 0000000000000000...0 |

I/O ASSIGNMENT TABLE

| | I/O DEVICE 1 | I/O DEVICE 2 | ... | I/O DEVICE m |
|---|---|---|---|---|
| VIRTUAL MACHINE 1 | NONE | INDIRECT I/O | ... | NONE |
| VIRTUAL MACHINE 2 | DIRECT I/O | INDIRECT I/O | ... | NONE |
| ⋮ | ⋮ | ⋮ | ... | ... |
| VIRTUAL MACHINE n | NONE | NONE | ... | NONE |

FIG. 4

| ERROR TYPE | VIRTUAL MACHINE NO. | GUEST ADDRESS | ERROR PAGE ADDRESS | SUBSTITUTE PAGE ADDRESS | TEMPORARY PAGE ADDRESS | Poison BITMAP | ELIMINATION BITMAP |
|---|---|---|---|---|---|---|---|
| CACHE | 2 | 0x10408000 | x10408000 | NONE | NONE | 000000001111111100...0 | 000000001111111100...0 |
| MEMORY (INDIRECT I/O) | 5 | 0x10408000 | x10408000 | NONE | NONE | 111111110000000000...0 | 111100000000000000...0 |
| MEMORY (DIRECT I/O) | 3 | a | ... | 0xC0000000 | 0xC0001000 | 000000000000000011...0 | 000000000000000000...0 |
| NORMAL | 0 | a | ... | 0xC0000000 | 0xC0001000 | 000000000000000000...0 | 000000000000000000...0 |
| ... | ... | ... | ... | ... | ... | ... | ... |
| NORMAL | 0 | NONE | ... | NONE | NONE | 000000000000000000...0 | 000000000000000000...0 |

FIG. 5A

CPU MEMORY MAP AND PROTECTION TABLE

| GUEST ADDRESS | HOST ADDRESS | ACCESS RIGHTS |
|---|---|---|
| 0x00000000 | 0xC0000000 | PERMIT |
| 0x00001000 | 0xC0001000 | PERMIT |
| 0x00002000 | 0xC0002000 | PERMIT |
| 0x00002000 | 0xC0002000 | PERMIT |
| ⋮ | ⋮ | ⋮ |
| 0xFFFFF000 | 0x00000000 | PROHIBIT |

FIG. 5B

I/O MEMORY MAP AND PROTECTION TABLE

| GUEST ADDRESS | HOST ADDRESS | ACCESS RIGHTS |
|---|---|---|
| 0x00000000 | 0xC0000000 | PERMIT |
| 0x00001000 | 0xC0001000 | PERMIT |
| 0x00002000 | 0xC0002000 | PERMIT |
| 0x00002000 | 0xC0002000 | PERMIT |
| ⋮ | ⋮ | ⋮ |
| 0xFFFFF000 | 0x00000000 | PROHIBIT |

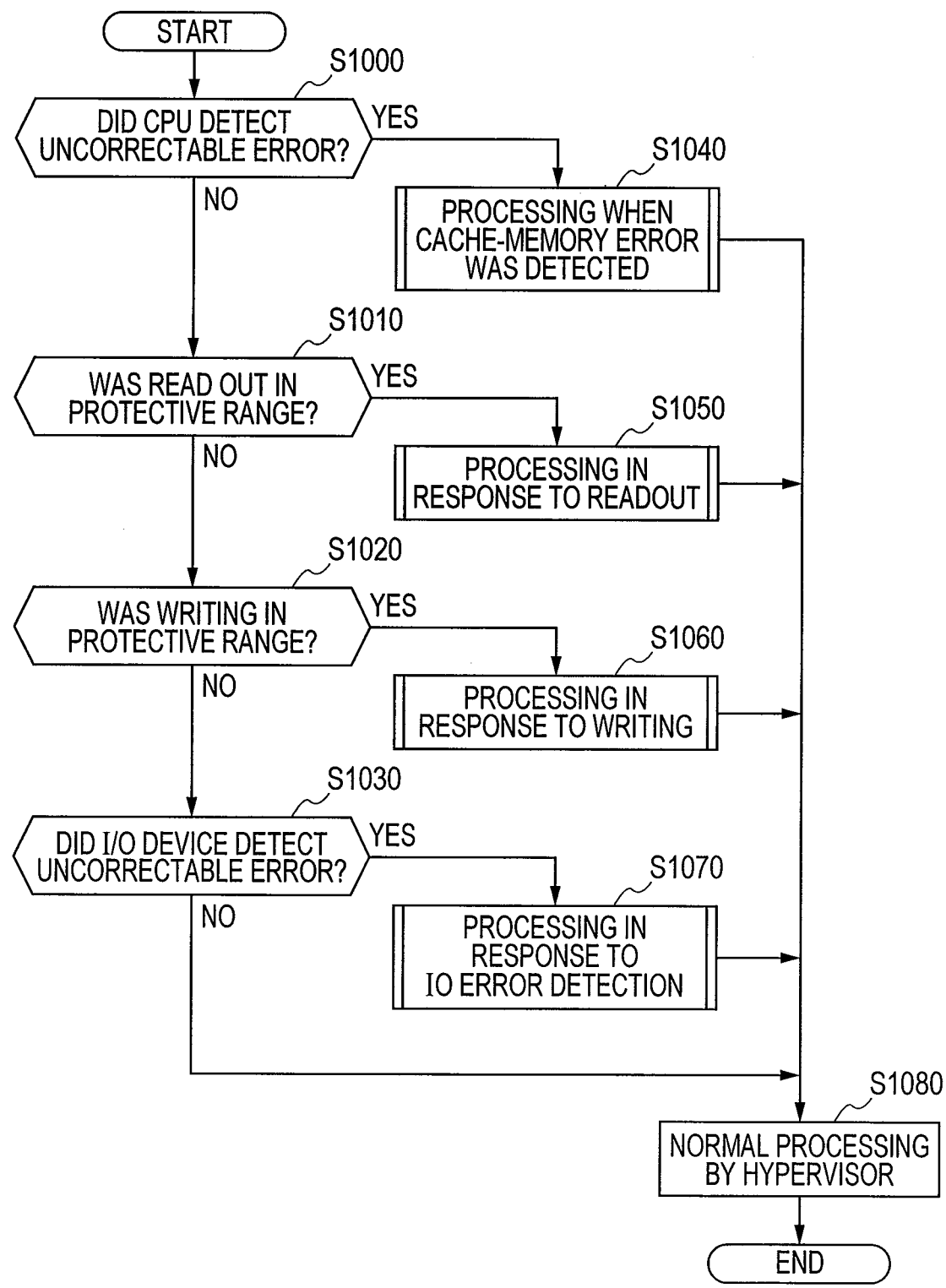

FAILURE MANAGEMENT METHOD AND COMPUTER

CLAIM OF PRIORITY

The present application claims priority from Japanese patent application JP 2010-103911 filed on Apr. 28, 2010, the content of which is hereby incorporated by reference into this application.

FIELD OF THE INVENTION

The present invention relates to a computer system, and relates in particular to technology for concealing uncorrectable errors in applications and in the OS running on the computer.

BACKGROUND OF THE INVENTION

Along with expanded open server performance and functions, the comparatively inexpensive and high-performance Xeon (registered trademark, same hereafter) server containing the Xeon CPU made by the Intel Corporation (registered trademark, same hereafter) has become the mainstream in corporate IT systems. The Xeon CPU contains numerous internal CPU core that boost processing performance of the server as a whole and by 2010 each CPU package is expected to include 8 cores.

Virtual server technology is a widely utilized method for efficiently operating the CPU cores within the Xeon server. In this server technology, multiple virtual server environments (virtual machines, VMs) are generated on a single actual (hardware) Xeon server and the OS and applications are operated in these VMs. In recent years, users operating ten to dozens of VMs in standard Xeon servers have become common.

However as more and more VMs are operated on the single actual hardware server, the risk of VM operation stopping due to a server component failure becomes drastic. Encoding by ECC (Error Correcting Code) for example is applied to data in the memory but if a UE (Uncorrectable Error) such as a 2-bit error occurs then the Xeon server of the related art is seen as having a fatal error and operation of all VMs on that server operation must be stopped.

In contrast, in the Xeon CPU (Nehalem-EX) scheduled for market shipment in 2010, the failure management was redesigned on the architecture level (See for example, IntelR 64 and IA-32 Architectures Software Developer's Manual 3A Chapter 15.6 Recovery of Uncorrected Recoverable (UCR) Errors) and a mechanism to trace error data and perform error correction was added based on Poisoning. Here "Poisoning" is a function to generate error data (poison) that is assigned a specified graph or syndrome pattern (decoding symbol error pattern) when the hardware detects an UE, and to perform failure management at the point in time that the software reads the poison. If the poison was eliminated by overwriting, then the software can no longer read the poison so no failure management is performed.

To carry out UE detection and failure management, the Nehalem-EX contains a core section to execute commands and an uncore section to exchange data between the memory and the I/O. The core and the uncore sections handle different UE levels within the Nehalem-EX.

(1) The core section detects UE relating to memory readout. caused by executing commands. In this case the core section conveys a fatal error message to the software and system operation stops, causing all software on the applicable server to stop.

(2) The uncore section detects UE relating to a scrubbing process that periodically reads-out/rewrites the memory, and does write back of data onto the memory from the cache. In this case, after generating the poison, the uncore section conveys a recoverable error message to the software.

Therefore, when using Nehalem-EX, all of the UE detected by the core usually end in failure management processing such as system stoppage.

However if the uncore detects an UE, then the uncore conveys position information on the failed component to the software to allow overall server system operation to continue. The hypervisor for example controls the VM when notified of a recoverable error and at the IDF 2009 (Intel Developer Forum) an application was announced that stops only the VM containing the failure component (See for example, Building IT Server Solutions on Intel Microarchitecture (Nehalem-EX)-based Platforms Featuring Windows Server 2008 R2 and Hyper-V. Intel Developer Forum 2009). This technology moreover applies to the OS so an application of this technology was also announced where the OS stops just the application containing the failed memory under the same conditions.

SUMMARY OF THE INVENTION

The above described scrubbing and write back processes that act on the installed memory regions. The related art therefore has the problem that all related VM on the Xeon server are stopped when a UE is detected in the memory regions (a) below.
(a) Non-Initialized Memory Regions Among the Heap and Stack Regions.

The (a) memory regions are utilized after initializing the OS or application. So no fatal errors occur because none of the UE detected during write back or scrubbing are read out by the core. Essentially there should therefore be no need to immediately stop a VM or application including the applicable region.

However, the hypervisor (or virtual machine monitor VMM) generally cannot judge whether an OS or application memory is initialized or not initialized. The hypervisor first confirms whether a fatal error has occurred or not when poison is read out from the OS or application. Taking failure management measures such as shutting down the VM when a UE was detected was therefore unavoidable in order to prevent a future fatal error. Consequently, operation of other VM unrelated to the error and not requiring immediate stoppage was also stopped because the error range could not be limited.

The OS was also unable to judge whether an application memory was initialized or not initialized and therefore had the same problem.

Limiting the failure range in the Xeon server requires meeting the following three conditions.

First Condition: Judge whether the detected UE is a TRUE DUE where poison was read out; or a FALSE DUE where no Poison was read out (DUE: Detected Uncorrectable Error).

Second Condition: Avoid stopping the system even after confirming a TRUE DUE from read out of Poison utilizing the Xeon CPU that tends to stop the system due to Poison readout.

Third Condition: Continue to operate the VM and applications in the case of a FALSE DUE where no poison was read out.

Satisfying all of these conditions in order to limit the failure range is the essential issue.

A representative aspect of the present invention is given as follows. Namely, a failure management method for a computer including a processor, and a memory connected to the processor; and uniquely featured in that the processor contains a memory protection function to prohibit access to a specified address of the memory; to execute a first software program stored in the memory, and to execute a second software program for monitoring the execution of the first software program stored in the memory; and the second software program retains address information on the memory address where the error occurred, and error information including access-related information on the access state of the address; and the method includes a first step in which the second software program detects an error occurring in the memory; and a second step in which the second software program adds the memory address where the error occurred to the error information; and a third step in which the second software program prohibits access to the memory address where the error occurred by changing the memory protection function setting and by monitoring the access state to the memory address where the error occurred; and a fourth step in which the second software program executes failure management processing when access to the memory address where the error occurred by the first software program was detected.

The present invention is capable of discriminating the type of error by whether there is reading or writing in the memory by the first software program and, limiting the effects of the error to the first software program using the applicable memory when there is no writing by the first software program; and continuing the first software program processing when there is no writing by the first software program. The present invention therefore limits the range of error effects even in processors that stop the system during readout of an address in the memory where an error occurred.

BRIEF DESCRIPTION OF THE DRAWINGS

FIG. 4 is a drawing showing an example of the Poison table in the embodiment of this invention;

FIG. 5A is a drawing showing an example of the CPU memory map and protection table in the embodiment of this invention;

FIG. 5B is a drawing showing an example of the I/O memory map and protection table in the embodiment of this invention;

FIG. 11 is a flowchart showing an overall image of the error processing executed by the hypervisor of the embodiment of this invention;

DETAILED DESCRIPTION OF THE PREFERRED EMBODIMENTS

The embodiments of the present invention are described next while referring to the accompanying drawings.

In this embodiment, the hypervisor executes the processing of this invention. The hypervisor is compatible with the supervisor software and the OS and applications are compatible with the user software. Moreover uncorrectable errors are also referred to as failures.

Hardware Structure

Figure 1:
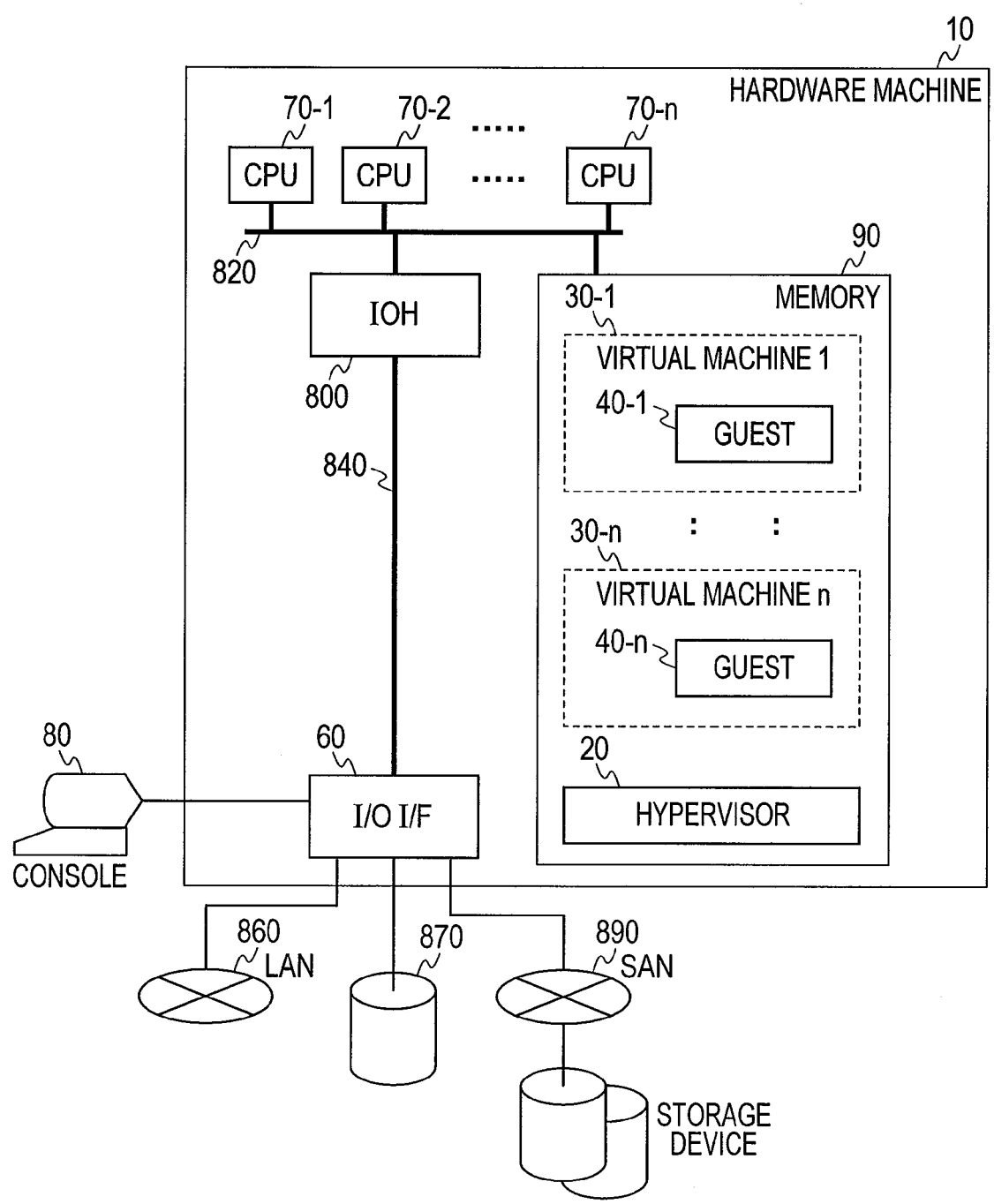
FIG. 1 is a block diagram showing the structure of the virtual machine system of the embodiment of this invention.

FIG. 1 is a block diagram showing the structure of the virtual machine system of the embodiment of this invention.

The hardware machine 10 includes one or more CPUs 70-1 through 70-n containing error detection functions. These CPUs 70-1 through 70-n are connected via an inter-chip interface 820 such as a QPI (QUICK Path InterConnect) or SMI (Scalable Memory InterConnect) to an IOH (I/O Hub) 800 and a memory 90.

The IOH 800 is connected via a bus 840 such as PCI express to the I/O device 60. The I/O device 60 includes a network adapter connected to the LAN860, a SCSI adapter connected to the disk device 870, etc; a fiber channel adapter connected to a SAN890 (Storage area network); and a graphic controller connected to the console 80. There may be one or multiple I/O devices 60.

The CPU 70 accesses the memory 90 via the inter-chip interface 820, and executes the specified processing after accessing the I/O device 60 from the IOH 800.

In the example shown in FIG. 1, the hardware machine 10 contains only one I/O device 60; however, the hardware machine 10 may contain multiple I/O devices 60.

The memory 90 stores information required in drder to execute the applicable program or programs executed by the CPU 70. As shown in FIG. 1, the hypervisor 20 loaded in the memory 90 executes the respective guests 40-1 through 40-n on the virtual machine 1 (30-1) through virtual machine n (30-n) that are elements of the applicable hypervisor 20 contained in the memory 90. Here the guest is a general name indicating the OS and application.

Hereafter, the general term CPU 70 is used if not discriminating between the CPU 70-1 through 70-n. The general term virtual machine 30 is used if not discriminating between the virtual machine 1 (30-1) through virtual machine n (30-n). The general term guest 40 is used if not discriminating between the guests 40-1 through 40-n.

Software Structure

Figure 2:
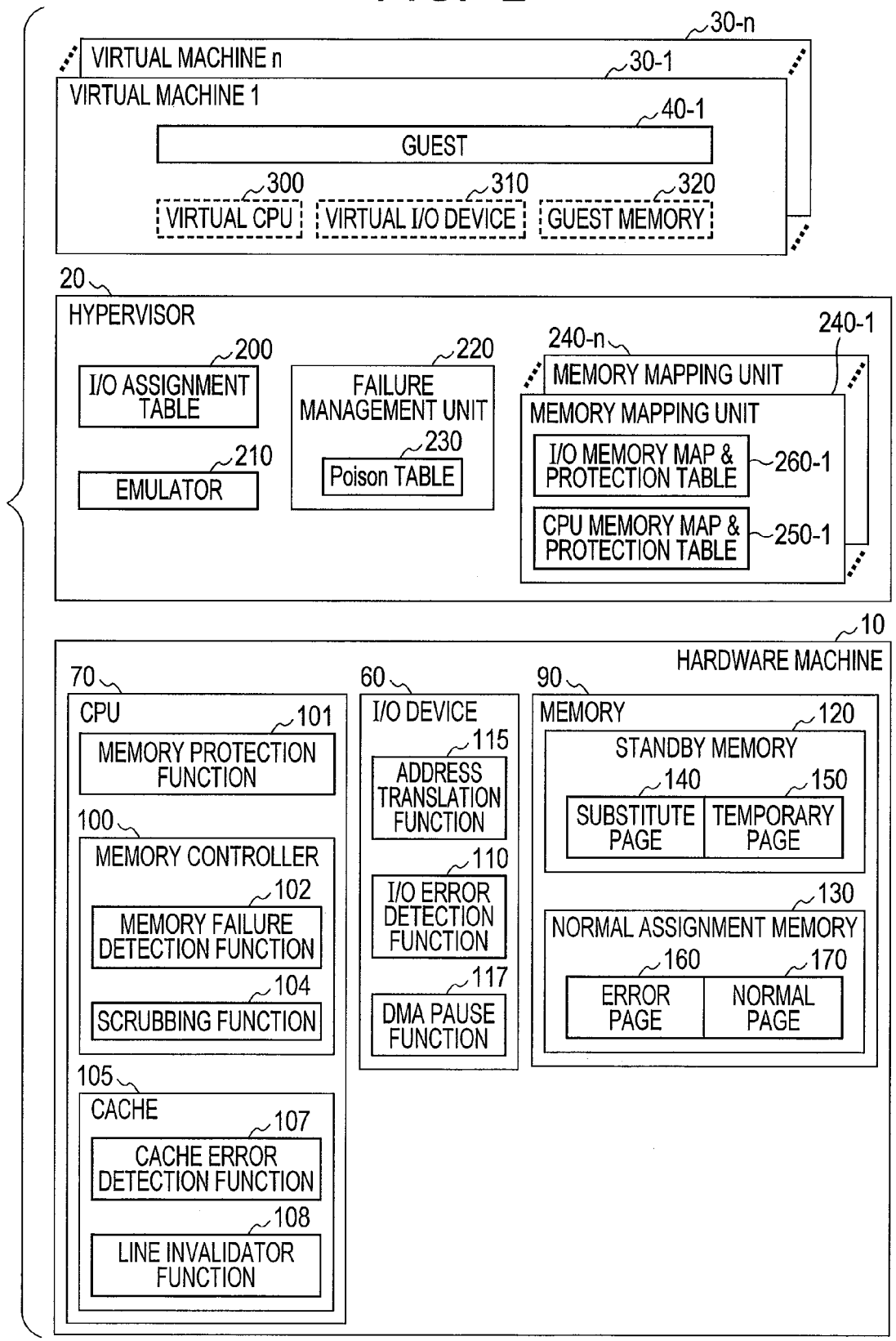
FIG. 2 is a stack drawing showing essential sections of the software and hardware of the virtual machine system of the embodiment of this invention.

Essential sections configuring the software for achieving the virtual machine 30 in the hardware machine 10 as well as the hardware elements for control are described while referring to FIG. 2.

FIG. 2 is a stack drawing showing essential sections of the software and hardware of the virtual machine system of the embodiment of this invention.

A hypervisor 20 operating on the hardware machine 10 controls one or more virtual machines 30.

The virtual machine 30 contains a virtual CPU 300 implemented by the (hardware) CPU 70, a virtual I/O device 310 implemented by the I/O device 60, and a guest memory 320 implemented by a memory 90. The guest 40 operates in the virtual machine 30.

The hypervisor 20 contains an I/O assignment table 200, an emulator 210, a failure management unit 220, and the memory mapping units 240-1 through 240-n.

The I/O assignment table 200 stores the I/O device 60 assignment states in the virtual machine 30. The I/O assignment table 200 is described in detail later on while referring to FIG. 3.

An emulator 210 implements the virtual CPU 300, the virtual I/O device 310 and the guest memory 320.

The failure management unit 220 executes processing to deal with the failure that occurred. The failure management unit 220 includes a Poison table 230.

The Poison table 230 stores the Poison position and the access state. The Poison table 230 is described in detail later on using FIG. 4.

The memory mapping unit 240-1 manages assignment of the memory 90 to the virtual machine 1 (30-1). The memory mapping unit 240-1 sets the handling of the guest memory 320 and the memory 90, and stores two types of memory maps and protection tables for setting access rights. More specifically, the memory mapping unit 240-1 contains an I/O memory map & protection table 260-1 and a CPU memory map & protection table 250-1. The CPU memory map & protection table 250-1 is applied to the CPU 70. The I/O memory map & protection table 260-1 applies to the I/O device 60.

The memory mapping unit 240-1 may include the CPU memory map & protection table 250-1 and the I/O memory map & protection table 260-1 as one table.

The other memory mapping units 240-2 through 240-n are the same structure.

The term memory mapping unit 240 is hereafter utilized if not discriminating among the memory mapping units 240-1-240-n. The terms I/O memory map & protection table 260 and CPU memory map & protection table 250 are utilized if not discriminating among the I/O memory map & protection table 260-1 and a CPU memory map & protection table 250-1.

The hardware machine 10 contains the CPU 70, the I/O device 60 and the memory 90.

The CPU 70 contains the memory protection function 101, the memory controller 100 and the cache 105.

The memory protection function 101 controls access and performs address conversion in the guest memory 320. The memory protection function 101 searches the CPU memory map & protection table 250 and if the guest 40 is accessing (reading or writing) the guest memory 320 then the memory protection function 101 judges the corresponding host address and whether to allow or prohibit access. If the decision is that access is prohibited, then the memory protection function 101 notifies the failure management unit 220 of the unauthorized access.

The memory protection function 101 in other words, is a function to protection an applicable range in order to prohibit access to a specified access range in the memory 90, and a function to monitor access to the applicable address range.

The memory controller 100 controls the reading and writing on the memory 90. The memory controller 100 contains a memory failure detection function 102 and a scrubbing function 104.

During readout of data from the memory 90, the memory failure function 102 checks the validity of error detection code that the memory controller 100 attached to the data. Here, this error detection code is data that the memory controller 100 attached to the data written into the memory 90 by the memory controller 100.

When an uncorrectable error was detected, the memory failure detection function 102 stores the Poison in the memory 90 and also notifies the failure management unit 220 that the Poison was stored.

The scrubbing function 104 checks the data stored in the memory 90 that is separate from the software operation.

The cache 105 stores a portion of the data from the memory 90. This cache 105 contains a cache error detection function 107 and a line invalidator function 108.

The cache error detection function 107 checks the validity of error detection coding attached by the cache 105 as needed. The cache 105 attaches the error detection coding to the stored data. If the cache error detection function 107 finds an error in the timing that the data was written back onto the memory 90, it stores Poison in the memory 90 and also notifies the failure management unit 220 that Poison was stored.

The line invalidator function 108 invalidates the cache line that generated a cache error.

The I/O device 60 contains an address translation function 115, I/O error detection function 110, and a DMA pause function 117.

The address translation function 115 calculates the memory 90 address corresponding to the guest memory 320. The address translation function 115 searches the I/O memory map & protection table 260, and judges the corresponding host address if the I/O device 60 accesses the guest memory 320.

When there was Poison in results from data readout from the memory 90, the I/O error detection function 110 notifies the CPU 70 via the IOH 800 that an error has occurred.

The DMA pause function 117 places access to the guest memory 320 on hold.

The memory 90 is managed while sub-divided into a normal assignment memory 130 and a standby memory 120.

The normal assignment memory 130 is memory assigned to the virtual machine 30. The standby memory 120 is memory utilized when an error occurs.

The normal assignment memory 130 includes an error page 160 containing Poison, and a normal page 170 that does not contain Poison.

The standby memory 120 contains a substitute page 140 assigned instead of the memory where the error occurred; and the temporary page 150 that temporarily stores the values utilized to overwrite the Poison by the guest 40. Here, a page signifies the minimum unit of assigned memory and the size of a page in this embodiment is assumed to be "4 Kbytes." The size of the Poison is assumed to be "8 bytes."

Figure 3:
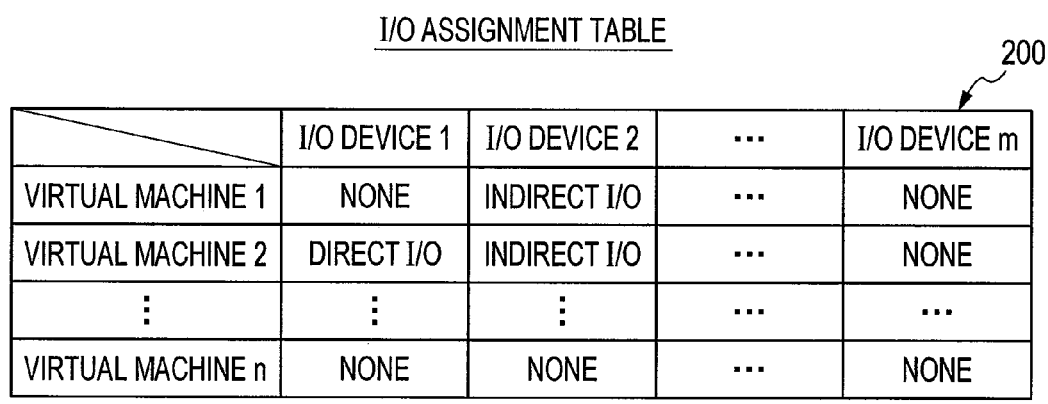
FIG. 3 is a diagram showing one example of the I/O assignment table in the embodiment of this invention.

FIG. 3 is a diagram showing one example of the I/O assignment table 200 in the embodiment of this invention.

The I/O assignment table 200 stores the assignment states of each I/O device 60 in all the virtual machines 30. In the example in FIG. 3, the I/O assignment table 200 stores the assignment states for I/O devices 1-m, that correspond to the virtual machine 1 (30-1) to virtual machine n (30-n).

There are three assignment states; "Direct I/O", "Indirect I/O" and "None".

The "Direct I/O" is an assignment state where the I/O device 60 can directly operate the guest memory 320 by utilizing DMA (Direct Memory Access), etc.

The "Indirect I/O" is a state where the hypervisor 20 operates the guest memory 320, instead of the I/O device 60 directly operating the guest memory 320.

The "None" state signifies there are no I/O device 60 assignments.

In this embodiment, a virtual machine 30 containing one or more I/O devices 60 assigned as direct I/O, is described as a direct I/O virtual machine. A virtual machine containing only I/O devices 60 assigned as indirect I/O is described as an indirect I/O virtual machine.

The hypervisor 20 may retain the information in a format other than the I/O assignment table 200 if the correspondence between the virtual machine 30 and the I/O device 60 is known.

FIG. 4 is a diagram showing an example of the Poison table 230 in the embodiment of this invention.

The Poison table 230 contains an error type 400, a virtual machine No. 410, a guest address 420, an error page address 430, a substitute page address 440, a temporary page address 450, a Poison bitmap 460, and an elimination bitmap 470.

The error type 400 stores the type of detected error and the virtual machine 30 layout. There are four error types 400. These four types are the "Cache", the "Memory (indirect I/O)", "Memory (direct I/O)" and "Normal".

The "Cache" is an error conveyed by the cache error detection function 107. The "Memory (indirect I/O)" is an error in the memory assigned to the indirect I/O virtual machine 30 and that is conveyed by the memory failure detection function 102. The "Memory (direct I/O)" is an error in memories assigned to the direct I/O virtual machine 30 and conveyed by the memory failure detection function 102. The "Normal" error is a state where no errors occurred.

The virtual machine No. 410 stores the identifier (serial number) for identifying the virtual machine 30.

The guest address 420 stores the address of the guest memory 320. The error page address 430 stores the address of the error page 160. The substitute page address 440 stores the address of the substitute page 140. The temporary page address 450 stores the address of the temporary page 150.

The Poison bitmap 460 stores the position of the Poison within the page. The Poison bitmap 460 is a bitmap where one bit corresponds to each one byte on the error page 160; and sets a "1" on bits corresponding to the address where the Poison is stored within the page.

The elimination bitmap 470 stores the position of the Poison overwritten within the page. The elimination bitmap 470 is a bitmap where one bit corresponds to each one byte on the error page 160; and sets a "1" bit on the corresponding address when writing was detected on the address where Poison was stored.

The Poison table 230 is rewritten when an error is conveyed to the failure management unit 220, and when the guest 40 overwrote the Poison. The Poison table 230 is also searched when adding a virtual machine 30, and is utilized for assigning the memory 90 where errors have not occurred.

The hypervisor 20 utilizes the Poison bitmap 460 and the elimination bitmap 470 to decide whether or not there is writing on the address where the Poison is stored or in other words can judge if there is an access pattern.

If information on the error is known, then the hypervisor 20 may retain the information in a format other than the Poison table 230.

FIG. 5A is a diagram showing an example of the CPU memory map and protection table 250 in the embodiment of this invention. FIG. 5B is a drawing showing an example of the I/O memory map and protection table 260 in the embodiment of this invention;

The CPU memory map and protection table 250 and the I/O memory map and protection table 260 shown in FIG. 5A and FIG. 5B are identical structures.

The CPU memory map and protection table 250 and the I/O memory map and protection table 260 retain one entry on each page.

The CPU memory map and protection table 250 includes a guest address 500, a host address 510 and access right 520. The I/O memory map and protection table 260 includes a guest address 530, a host address 540, and access right 550.

The guest addresses 500 and 530 store the address for the guest memory 320. The guest addresses 500 and 530 are identical to the guest address 420. The host addresses 510, 540 store the address for the memory 90. The address rights 520 and 550 store the access rights to the memory. The access right 520 stores the "PERMIT" or "PROHIBIT".

If the hypervisor 20 knows how the guest address corresponds to the host address then it can retain the information in a format other than the CPU memory map and protection table 250 and the I/O memory map and protection table 260.

Figure 6:
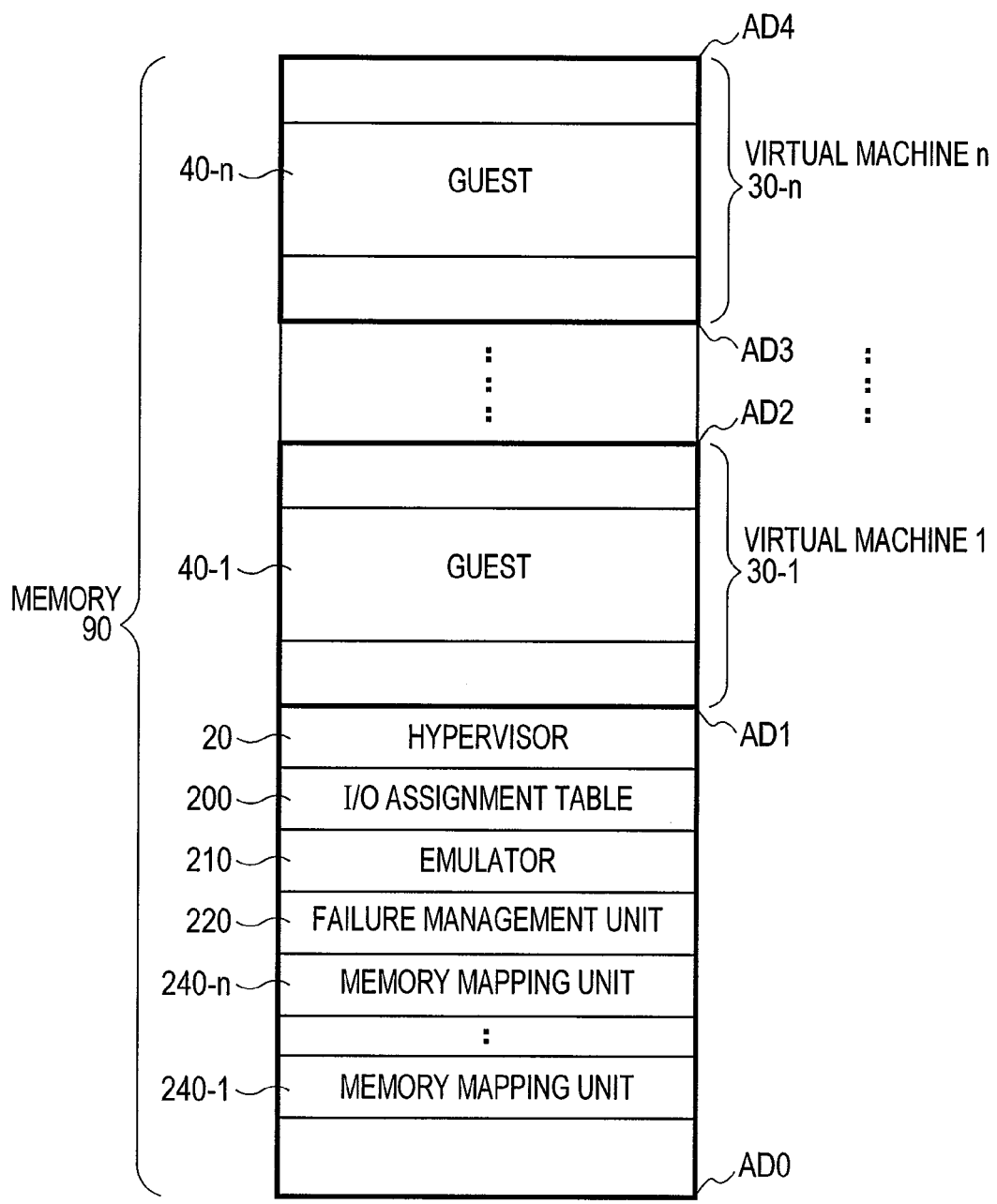
FIG. 6 is a drawing showing an example of the memory managed by the hypervisor in the embodiment of this invention.

FIG. 6 is a diagram showing an example of the memory 90 managed by the hypervisor 20 in the embodiment of this invention.

The hypervisor 20 manages the memory 90 assignments. The hypervisor 20 assigns regions on the memory 90 where the applicable hypervisor 20 is itself is located, and regions used by the virtual machine 30. The hypervisor 20 as shown in FIG. 6 for example, assigns the addresses AD0-AD1 to its own hypervisor 20, and assigns the addresses AD1-AD2 to the virtual machine 1 (30-1) and the addresses AD3-AD4 to the virtual machine n (30-n).

The guest (OS) 40 is assigned to the regions where each of the virtual machines 30 is assigned.

The I/O assignment table 200, the emulator 210, the failure management unit 220, and the memory mapping unit 240 are assigned to the region used by the hypervisor 20. Error types whose extent of impact can be limited This embodiment processes by error location, both errors in memory elements detected by scrubbing (hereafter described as memory errors); and errors in the cache detected during write back into the memory 90 from the cache 105 (hereafter described as cache errors). Conditions for error handling in this embodiment are described next (Table 1).

TABLE 1

| Error # | Error Location | Virtual Machine Type | Error Range | Function of actual hardware machine/hypervisor as precondition |
|---|---|---|---|---|
| 1 | Memory | Direct I/O | Only 1 poison | Pause the DMA |
| 2 | | Indirect I/O | No error in substitute page | — |
| 3 | Cache | — | No error in temporary page | Separate the error line |

The virtual machine type here indicates the assignment state of the I/O device 60 in the virtual machine 30. The direct I/O virtual machine 30 is a virtual machine 30 on which DMA (Direct Memory Access) of the guest memory 320 from one or more I/O devices 60 is allowed. The indirect I/O virtual machine 30 is a virtual machine 30 where DMA of the guest memory 320 from the I/O device 60 is not permitted whatsoever. Only the hypervisor 20 can operate the guest memory 320 on the indirect I/O virtual machine 30.

In this embodiment, only the simple case is covered where only a single Poison (8 bytes) is generated on a page when a memory error has occurred on the direct I/O virtual machine 30.

For purposes of simplicity, there is no processing of the following dual errors (dual failures). Namely, if a memory error occurs in the indirect I/O virtual machine 30, and also an error occurs in the substitute page 140 then the embodiment see these errors as a dual error and no response is made. Moreover cache errors occurring in the temporary page 150 are seen as dual errors and no response is made. A cache error and a memory error occurring on the same page are also seen as a dual error and no response is made.

The operation of this embodiment assumes that the I/O device 60 contains a DMA pause function 117 to temporarily stop DMA of the guest memory 320. Another precondition for this embodiment operation is that the CPU 70 contains a line invalidator function 108 to automatically stop usage of a cache line having an error.

The present embodiment processes the three cases (Table 1) however the embodiment can also process two of the cases or one of the cases if the respective judgment conditions for identifying each case are omitted.

Method for Implementing the Guest Memory in the Failure Processing

The guest memory 320 transition in the each process for eliminating Poison from error detection is described next.

Figure 7A:
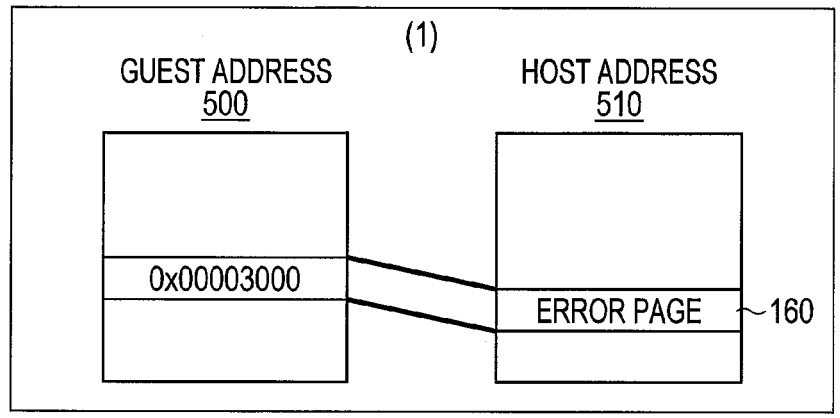
FIG. 7A is a drawing showing memory map transitions in each process that eliminates Poison from the error detection in the embodiment of this invention.
Figure 7B:
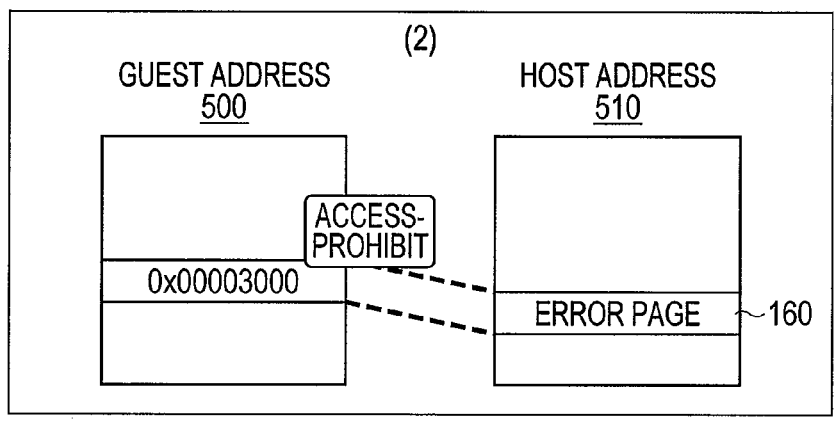
FIG. 7B is a drawing showing memory map transitions in each process that eliminates Poison from the error detection in the embodiment of this invention.
Figure 7C:
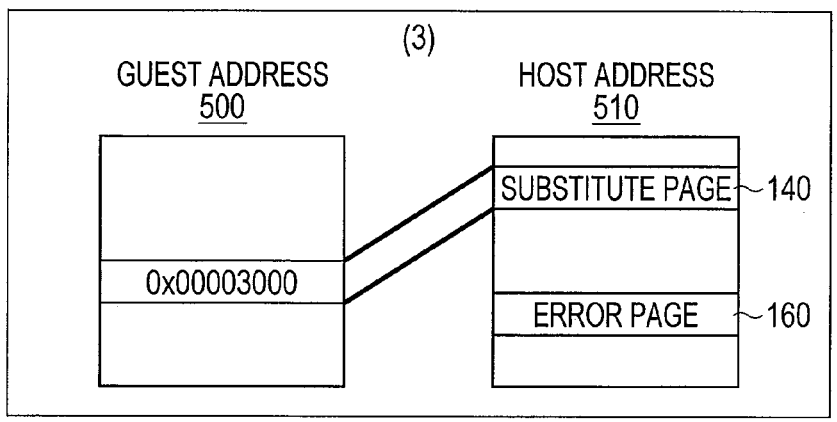
FIG. 7C is a diagram showing memory map transitions in each process that eliminates Poison from the error detection in the embodiment of this invention.

FIG. 7A, FIG. 7B, and FIG. 7C are diagrams showing memory map transitions in each process to eliminate Poison from the error detection.

Each figure shows the corresponding relation between the guest address 500 and the host address 510. FIG. 7A is a memory map (1) expressing the state where the specified page of guest address 500 is mapped on the error page 160.

FIG. 7B is a memory map (2) expressing the state where access of the error page 160 by the guest 40 is prohibited.

FIG. 7C is a memory map (3) expressing the state where the map destination of the specified page of guest address 500 is changed into the substitute page 140.

Hereafter, the memory map shown in FIG. 7A is described as memory map (1); the memory map shown in FIG. 7B is described as memory map (2), and the memory map shown in FIG. 7C is described as memory map (3).

Figure 8A:
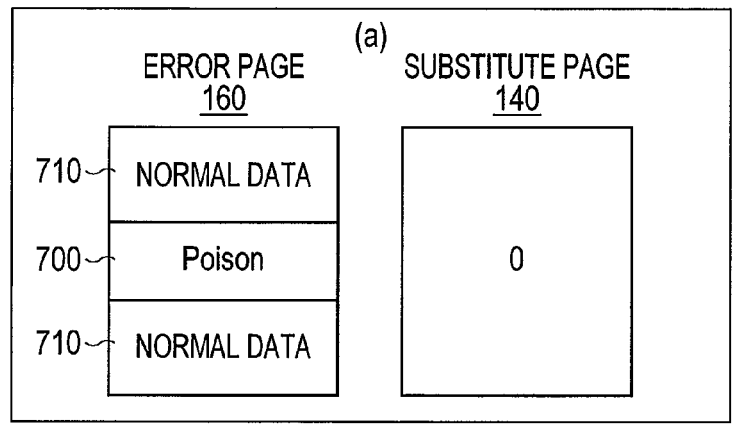
FIG. 8A is a drawing showing the state of the page within the memory at each stage in eliminating Poison from the detected memory error that occurred in the direct I/O of the virtual machine in the embodiment of this invention.
Figure 8B:
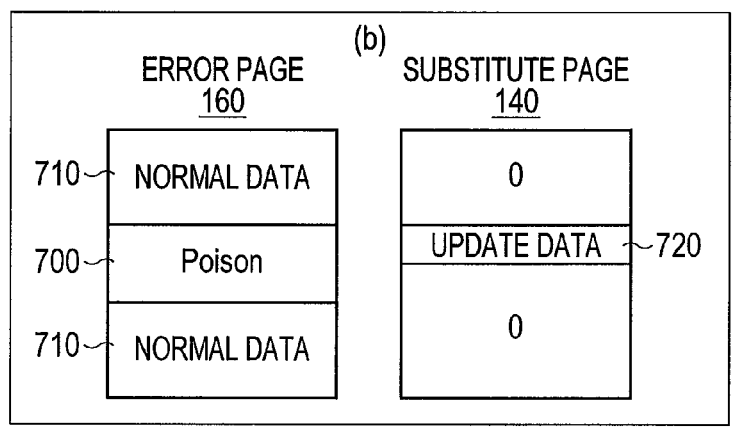
FIG. 8B is a drawing showing the state of the page within the memory at each stage in eliminating Poison from the detected memory error that occurred in the direct I/O of the virtual machine in the embodiment of this invention.
Figure 8C:
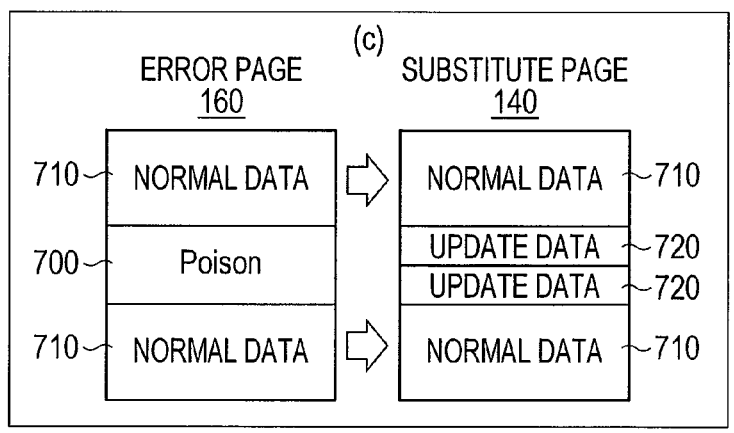
FIG. 8C is a drawing showing the state of the page within the memory at each stage in eliminating Poison from the detected memory error that occurred in the direct I/O of the virtual machine in the embodiment of this invention.

FIG. 8A, FIG. 8B, and FIG. 8C are diagrams showing the state of the page within the memory 90 at each stage from detection of the memory error that occurred in the direct I/O virtual machine 30 to eliminate poison in the embodiment of the present invention.

In each of these states, the error page 160 including the Poison 700, and the substitute page 140 assigned instead of the error page 160 are both handled together as a pair.

FIG. 8A shows the state (a) of each page immediately after the error has occurred. All data on the substitute page 140 is "0" immediately after being assigned.

FIG. 8B shows the state (b) where the guest 40 has utilized the CPU 70 in order to overwrite a portion of the 8 byte Poison 700. In this case, the data (update data 720) used to overwrite onto the Poison 700 is stored in the substitute page 140. The values overwritten onto the normal data 710 on the other hand are stored in the error page 160.

In the state (b) when the guest 40 utilized the CPU 70 to read the normal data (data other than Poison 700) 710 within the error page 160, the hypervisor 20 reads out the error page 160 and responds. Moreover, in the state (b) when the guest 40 utilized the CPU 70 to read out the update data 720 within the substitute page 140, the hypervisor 20 reads the substitute page 140 and responds. Also, in the state (b) when the I/O device 60 reads the normal data 710 or the Poison 700, the data within the error page 160 is read out unchanged.

FIG. 8C shows the state (c) after the guest 40 has rewritten all the Poison 700 within the page. Data (normal data 710) other than the Poison 700 contained within the error page 160 is merged with the substitute page 140 as shown in FIG. 8C.

Table 2 shows the relation between memory map transitions and page status when a memory error has occurred in the direct I/O virtual machine 30.

TABLE 2

| | CPU Memory Protection | I/O Memory Protection | Page Status |
|---|---|---|---|
| (1) Before error occurs | Memory map (1) | Memory map (1) | (a) |
| (2) During failure processing | Memory map (2) | Memory map (1) | (b) |

TABLE 2-continued

|  | CPU Memory Protection | I/O Memory Protection | Page Status |
|---|---|---|---|
| (3) During restore processing | Memory map (2) | Memory map (1) | (c) |
| (4) After restore processing | Memory map (3) | Memory map (3) | (d) |

The memory map (1) is applied in the initial state, and the guest address 500 can then access the error page 160 containing the Poison 700. When the guest 40 reads the Poison 700 in this state, a fatal error occurs and the system stops.

To avoid a system stoppage, the hypervisor 20 applies a memory map (2) to the CPU 70, and prohibits accessing of the error page 160 by the CPU 70 while the guest 40 is operating. Processing by the failure management unit 220 is in this way implemented just prior to reading and writing by the guest 40. In order to prevent a fatal error from occurring, the memory map (1) is applied to the I/O device 60 until restore processing is completed, and the memory map (3) is applied after restoration.

Settings to prohibit accessing the CPU 70 are canceled when overwriting of Poison by the guest 40 has eliminated the Poison. Usage of the error page 160 is stopped and the memory map (3) to which the substitute page 140 is assigned is now applied.

After restoring, the memory map (3) is applied as shown in FIG. 7C so that the guest 40 can perform memory operations on the substitute page 140 after elimination of Poison.

Figure 9A:
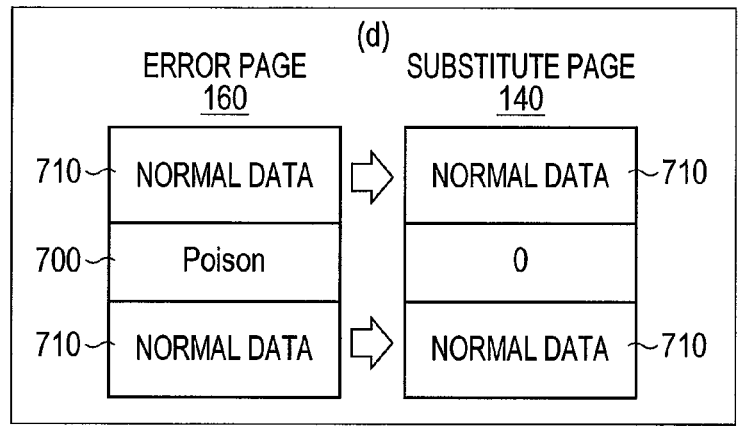
FIG. 9A is a drawing showing the state of the page within the memory at each stage in eliminating Poison from the detected memory error that occurred in the indirect I/O of the virtual machine in the embodiment of this invention.
Figure 9B:
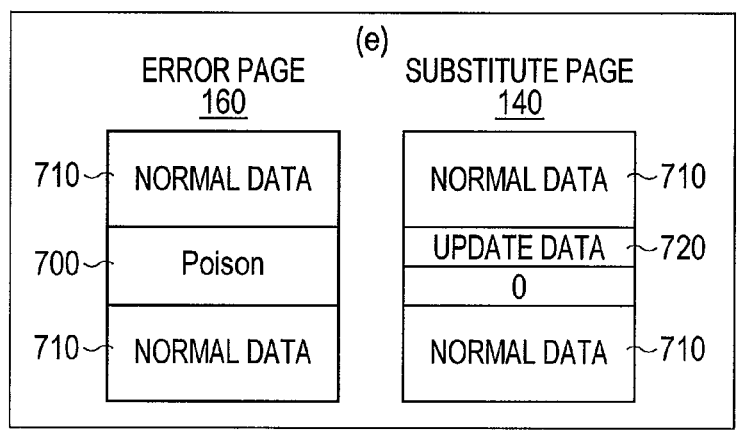
FIG. 9B is a drawing showing the page state within the memory at each stage in eliminating Poison from the detected memory error that occurred in the indirect I/O of the virtual machine in the embodiment of this invention.
Figure 9C:
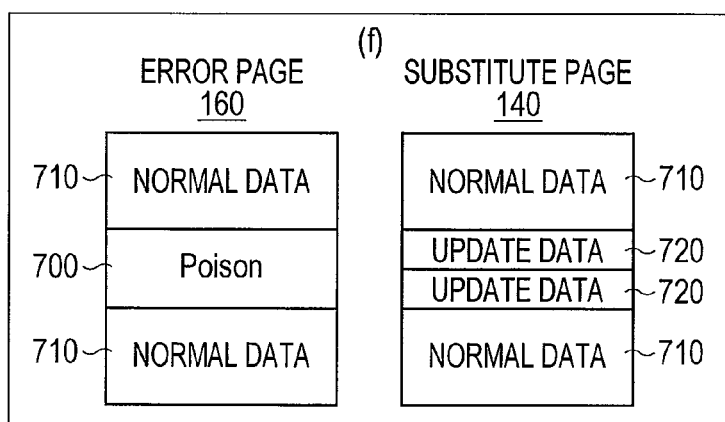
FIG. 9C is a drawing showing the state of the page within the memory at each stage in eliminating Poison from the detected memory error that occurred in the indirect I/O of the virtual machine in the embodiment of this invention.

FIG. 9A, FIG. 9B and FIG. 9C are diagrams showing the page state within the memory 90 at each stage from the detected memory error generated by the indirect I/O virtual machine 30 to eliminate Poison in the embodiment of this invention.

In each of these states, the error page 160 including the Poison 700, and the substitute page 140 assigned instead of the error page 160 are both handled together as a pair.

FIG. 9A shows the state (d) of each page immediately after the error has occurred. The normal data 710 is copied onto the substitute page 140 immediately after assignment and all data in the region corresponding to the Poison is at "0".

FIG. 9B shows the state (e) in which the guest 40 has utilized the CPU 70 to overwrite a portion of the eight byte Poison 700. In this case, the values overwriting the update data 720 and the normal data 710 are both stored in the substitute page 140.

In the state in (e) when the guest 40 utilized the CPU 70 to read the normal data (data other than Poison 700) 710 within the error page 160, the hypervisor 20 reads the error page 160 and responds. Moreover, in the state (e) when the guest 40 utilized the CPU 70 to read the update data 720 of substitute page 140, the hypervisor 20 reads the substitute page 140 in response.

The (f) in FIG. 9C indicates the state after the guest 40 rewrites all the Poison 700 within the page.

Table 3 shows the relation between memory map transitions and page state when a memory error has occurred in the indirect I/O virtual machine 30.

TABLE 3

|  | CPU Memory Protection | I/O Memory Protection | Page Status |
|---|---|---|---|
| (1) Before error occurs | Memory map (1) | — | (d) |
| (2) During failure processing | Memory map (2) | — | (e) |

TABLE 3-continued

|  | CPU Memory Protection | I/O Memory Protection | Page Status |
|---|---|---|---|
| (3) During restore processing | Memory map (2) | — | (f) |
| (4) After restore processing | Memory map (3) | — | (f) |

There is no processing performed here on the I/O device 60.

The memory map (1) is applied in the initial state in the CPU 70, and the guest address 500 can then access the error page 160 containing the Poison 700. When the guest 40 reads the Poison 700 in this state, a fatal error occurs and the system stops.

To avoid a system stoppage, the hypervisor 20 applies a memory map (2) to the CPU 70, and prohibits accessing of the error page 160 by the CPU 70 while the guest 40 is operating. Processing by the failure management unit 220 is in this way implemented just prior to reading and writing by the guest 40.

After restoration, the memory map (3) is applied as shown in FIG. 9C so that the guest 40 can perform memory operations on the substitute page 140 after elimination of Poison.

Figure 10A:
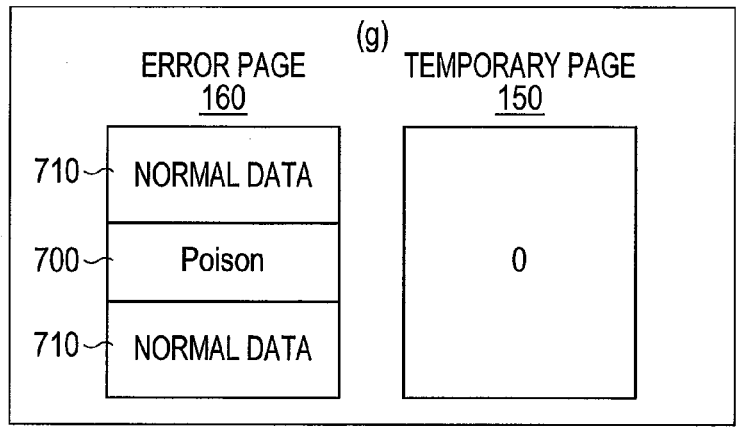
FIG. 10A is a drawing showing the state of the page within the memory at each stage in eliminating Poison from the detected cache error in the virtual machine in the embodiment of this invention.
Figure 10B:
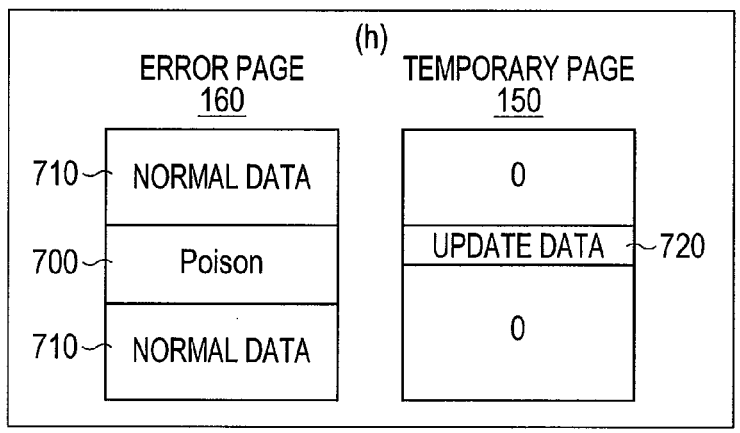
FIG. 10B is a drawing showing the state of the page within the memory at each stage in eliminating Poison from the detected cache error (in the virtual machine) in the embodiment of this invention.
Figure 10C:
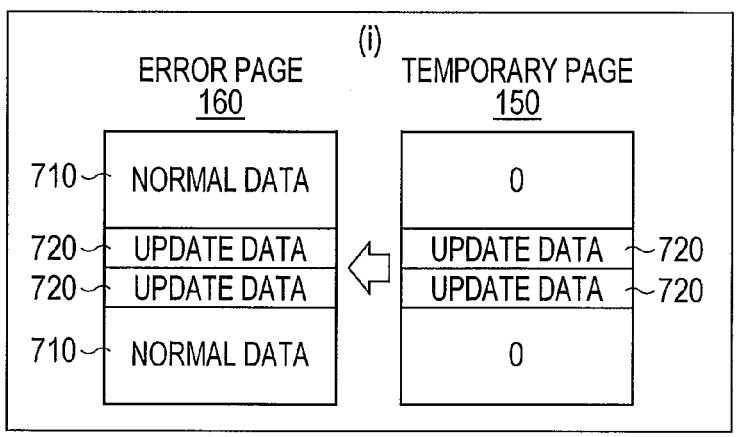
FIG. 10C is a drawing showing the state of the page within the memory at each stage in eliminating Poison from the detected cache error (in the virtual machine) in the embodiment of this invention.

FIG. 10A, FIG. 10B and FIG. 10C are diagrams showing the state of the page within the memory 90 at each stage from the detected cache error to eliminate poison in the virtual machine in the embodiment of this invention.

In each state, the error page 160 including the Poison 700, and the temporary page 150 temporarily retaining the update data 720 are both handled together as a pair.

FIG. 10A shows the state (g) immediately after the error has occurred. All data within the temporary page 150 immediately after assignment is at "0".

FIG. 10B shows the state (h) in which the guest 40 has utilized the CPU 70 to overwrite a portion of the eight byte Poison 700. The update data 720 is stored within the temporary page 150 to deal with the cache error. This measure is implemented so the guest 40 can perform rewrite correctly even of Poison 700 that cannot be rewritten in byte units. The overwritten normal data 710 values are stored in the error page 160.

In the state in (h), when the guest 40 utilized the CPU 70 to read the normal data 710 within the error page 160, the hypervisor 20 reads the error page 160 and responds. Also, in the state (h) when the guest 40 utilized the CPU 70 to read the update data 720 corresponding to just a portion of the overwritten Poison, then the hypervisor 20 reads the temporary page 150 in response.

FIG. 10C shows the state (i) after the guest 40 overwrites the entire eight bytes of Poison 700. As shown in FIG. 10C, the update data 720 stored in the temporary page 150 is written onto the Poison 700 contained in the error page 160.

Table 4 shows the relation between memory map transitions and page state when a cache error has occurred.

TABLE 4

|  | CPU Memory Protection | I/O Memory Protection | Page Status |
|---|---|---|---|
| (1) Before error occurs | Memory map (1) | Memory map (1) | (g) |
| (2) During failure processing | Memory map (2) | Memory map (1) | (h) |
| (3) During restore processing | Memory map (2) | Memory map (1) | (i) |
| (4) After restore processing | Memory map (1) | Memory map (1) | (i) |

The memory map (1) is applied in the initial state, and the guest address 500 can then access the error page 160 containing the Poison 700. When the guest 40 reads the Poison 700 in this state, a fatal error occurs and the system stops.

To avoid a system stoppage, the hypervisor 20 applies a memory map (2) to the CPU 70, and prohibits accessing of the error page 160 by the CPU 70 while the guest 40 is operating. Processing by the failure management unit 220 is in this way implemented just prior to reading and writing by the guest 40. The memory map (1) is applied to the I/O device 60 until restore processing is completed because no fatal error occurs.

One example of the failure processing executed by the hypervisor 20 is described next while referring to the flowchart.

Failure Processing Overview

FIG. 11 is a flowchart showing an overall image of the failure processing executed by the hypervisor 20 of the embodiment of this invention.

The processing from calling up the hypervisor 20 whenever an error is detected until the guest 40 operation restarts is described next utilizing this flowchart. Only sections relating to the failure processing are described in detail and all other processing is implemented during S1080.

The hypervisor 20 receives from the CPU 70 the cause of the call up of that hypervisor 20, and decides whether or not the applicable cause is detection of an uncorrectable error (S1000). More specifically, the hypervisor 20 decides if the cause of the call up was detection of a memory error during scrubbing, or detection of a cache error during write back.

The memory failure detection function 102 detects memory errors during scrubbing and the cache error detection function 107 detects cache errors during writeback.

If decided that the cause of the hypervisor 20 call up was detection of an uncorrectable error, then the hypervisor 20 performs processing (S1040) such as assigning a substitute page 140, or changing the memory protection settings when an error was detected in the cache 105 and the memory 90 and proceeds to S1080. The processing performed in S1040 is described later on using FIG. 12.

If decided that the cause of the hypervisor 20 call up was not detection of an uncorrectable error then the hypervisor 20 decides whether or not the call up of the hypervisor 20 itself was for reading of a protected region (S1010). More specifically, the hypervisor 20 decided if the cause of the call up was reading of the protected guest memory 320 (including error page 160) by the guest 40.

If decided that the cause of the hypervisor 20 call up was read out of a protected region then the hypervisor 20 executes processing to deal with reading of a protected region such as deciding whether or not the Poison 700 was read out or showing the error in the virtual machine 30 (S1050) and proceeds to S1080. The processing executed in S1050 is described later on using FIG. 14.

If decided that the cause of the hypervisor 20 call up was not reading out a protected region, then the hypervisor 20 decides whether or not the cause of the call up was writing onto a protected region (S1020). More specifically, the hypervisor 20 decides whether or not there is writing by the guest 40 into the protected guest memory 320 (including error page 160).

If decided there was writing onto the protected region, then the hypervisor 20 executed processing to deal with the writing in the protected region such as canceling the memory protection (S1060) and proceeds to S1080. The processing executed in S1060 is described later on using FIG. 16.

If decided there was no writing onto the protected region, then the hypervisor 20 decides whether or not the cause of the hypervisor 20 call up was detection of an uncorrectable error in the I/O device 60 (S1030).

The I/O error detection function 110 detects uncorrectable errors in the I/O device 60.

If decided that the cause of hypervisor 20 call up was not the detection of an uncorrectable error in the I/O device 60, then the hypervisor 20 proceeds to S1080.

If decided that the hypervisor 20 call up was due to an uncorrectable error in the I/O device 60, then the hypervisor 20 executes processing to deal with the I/O device error such as specifying the virtual machine 30 assigned I/O device that detected the error, and showing the error in the virtual machine 30 (S1070), and proceeds to S1080. The processing executed in S1070 is described later on using FIG. 15.

The hypervisor 20 executes normal processing not related to the failure processing and restarts the guest 40 (S1080), and terminates the processing.

Processing when a Cache and Memory Error was Detected

Figure 12:
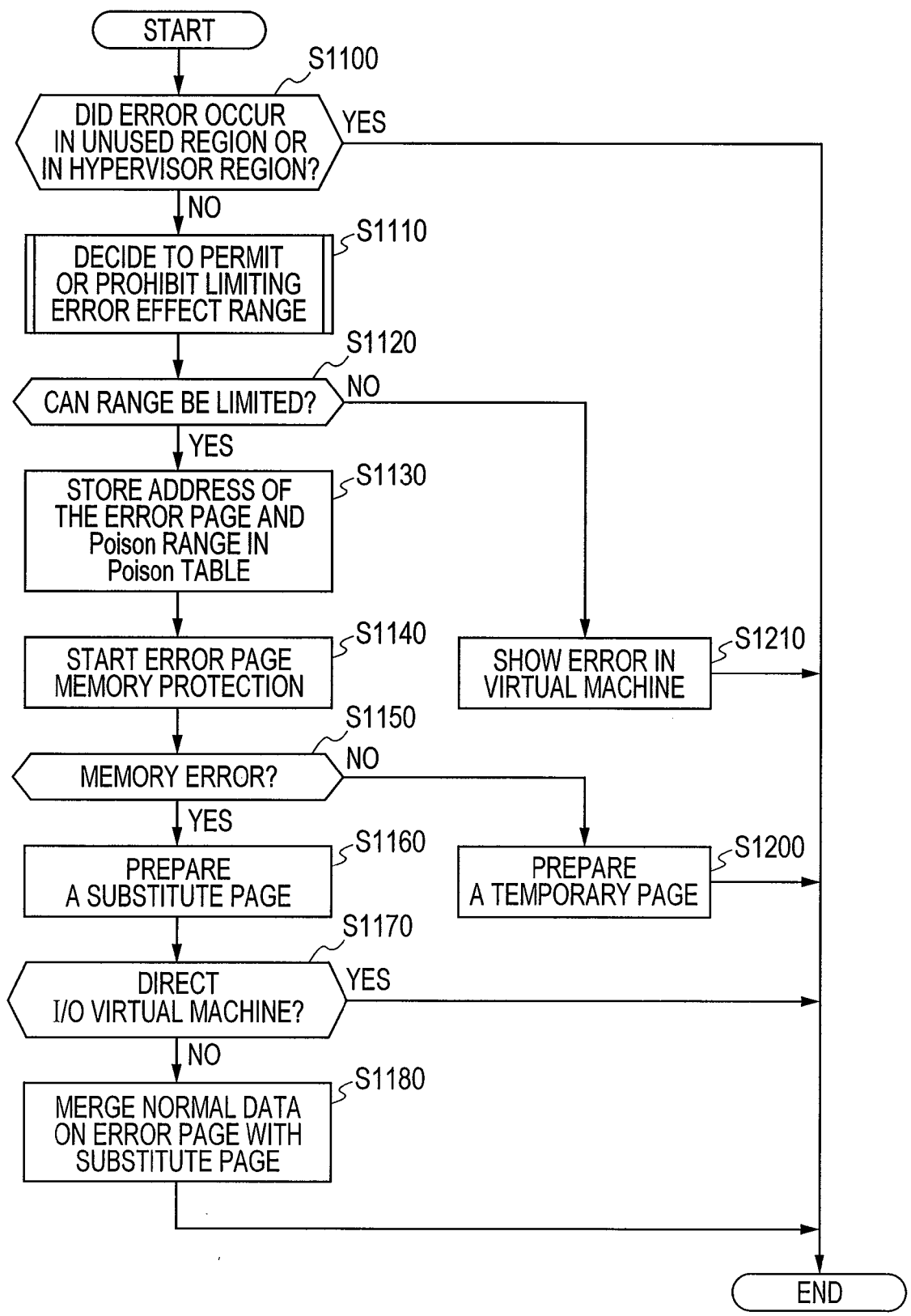
FIG. 12 is a flowchart showing the processing during cache and memory error detection executed in S1040 of the embodiment of this invention.

FIG. 12 is a flowchart showing the processing during cache and memory failure or error detection executed in S1040 of the embodiment of this invention.

The hypervisor 20 utilizes the memory mapping units 240 to accept the memory address of the region where the Poison was generated from the CPU 70, and decides whether or not the destination for assigning the applicable memory address is an unused region that is not yet assigned or is a region of the hypervisor 20 (S1100).

If decided the assignment destination of the memory address is an unused region that not yet assigned then no effects from this Poison will occur in the applicable unassigned region so the hypervisor 20 terminates the processing. If decided the assignment destination of the memory address is a region of the hypervisor 20 then the hypervisor 20 terminates the processing expecting that the region will be overwritten before the applicable Poison is read out.

If decided the assignment destination of the memory address is not an unused region or a hypervisor 20 region, then the hypervisor 20 decides whether to permit or prohibit limiting the error effect range that occurred (S1110). The processing for implementing S1110 is described later on utilizing FIG. 13.

Based on the decision results from S1110, the hypervisor 20 decides whether or not to limiting the error effects that occurred is possible (S1120).

If decided that limiting the effects of the error that occurred is not possible, the hypervisor 20 shows the effects of the error on the virtual machine 30 in which the memory address where the Poison was generated (S1210) and terminates the processing. The means for showing the effects may be a shutdown of the virtual machine 30, or conveying the error break-in to the guest 40.

If decided that limiting the error effect range that occurred is possible, then the hypervisor 20 registers the range of the Poison in the Poison table 230 (S1130).

More specifically, the hypervisor 20 stores the error type and the I/O assignment configuration of the virtual machine in the error type 400, and stores the information respectively in the virtual machine No. 410 and the error page address 430. The hypervisor 20 also stores the range of the Poison, and the offset in the page of the memory address where the Poison was generated, into the Poison bitmap 460, and clears the elimination bitmap 470 to zero. The hypervisor 20 further searches the CPU memory map & protection table 250, and identifies the guest address corresponding to the error page address 430, and stores the applicable guest address in the guest address 420.

The hypervisor 20 starts memory protection of the error page per the CPU 70 by changing the memory protection function 101 settings (S1140). More specifically, the hypervisor 20 changes the entry access right 520 for the corresponding CPU memory map & protection table 250 from "PERMIT" to "PROHIBIT."

The hypervisor 20 decides whether or not the error that occurred is a memory error (S1150) or in other words, branches the processing according to the type of error.

If decided the error is a cache error then the hypervisor 20 places the temporary page 150 holding the temporarily accumulated writing in byte units relative to the Poison, on the standby memory 120 (S1200) and terminates the processing. More specifically, the hypervisor 20 stores the address of temporary page 150 into the temporary address 450 of the Poison table 230. The states in the error page 160 change as shown in FIG. 10A through FIG. 10C.

If decided the error is a memory error then the hypervisor 20 places the substitute page 140 used instead of the memory 90 where the error occurred, into the standby memory 120 (S1160). The hypervisor 20 stores the address of the secured substitute page 140 into the substitute page address 440 in the Poison table 230.

The hypervisor 20 decides whether or not the virtual machine 30 is the direct I/O virtual machine 30 or not (S1170). In other words, the hypervisor 20 branches the processing according to the configuration virtual machine 30 assigned to the memory 90 where the error occurred.

If decided that the virtual machine assigned with the memory where the error occurred is the direct I/O virtual machine 30, then the hypervisor 20 terminates the process. The states of the error page 160 change as shown in FIG. 8A through FIG. 8C.

If decided that the virtual machine assigned with the memory where the error occurred is the indirect I/O virtual machine 30, then the hypervisor 20 merges the normal data 710 contained in the error page 160 with the substitute page 150 as shown in FIG. 9A (S1180) and terminates the process. The error page 160 is changed as shown in FIG. 9A through FIG. 9C.

Figure 13:
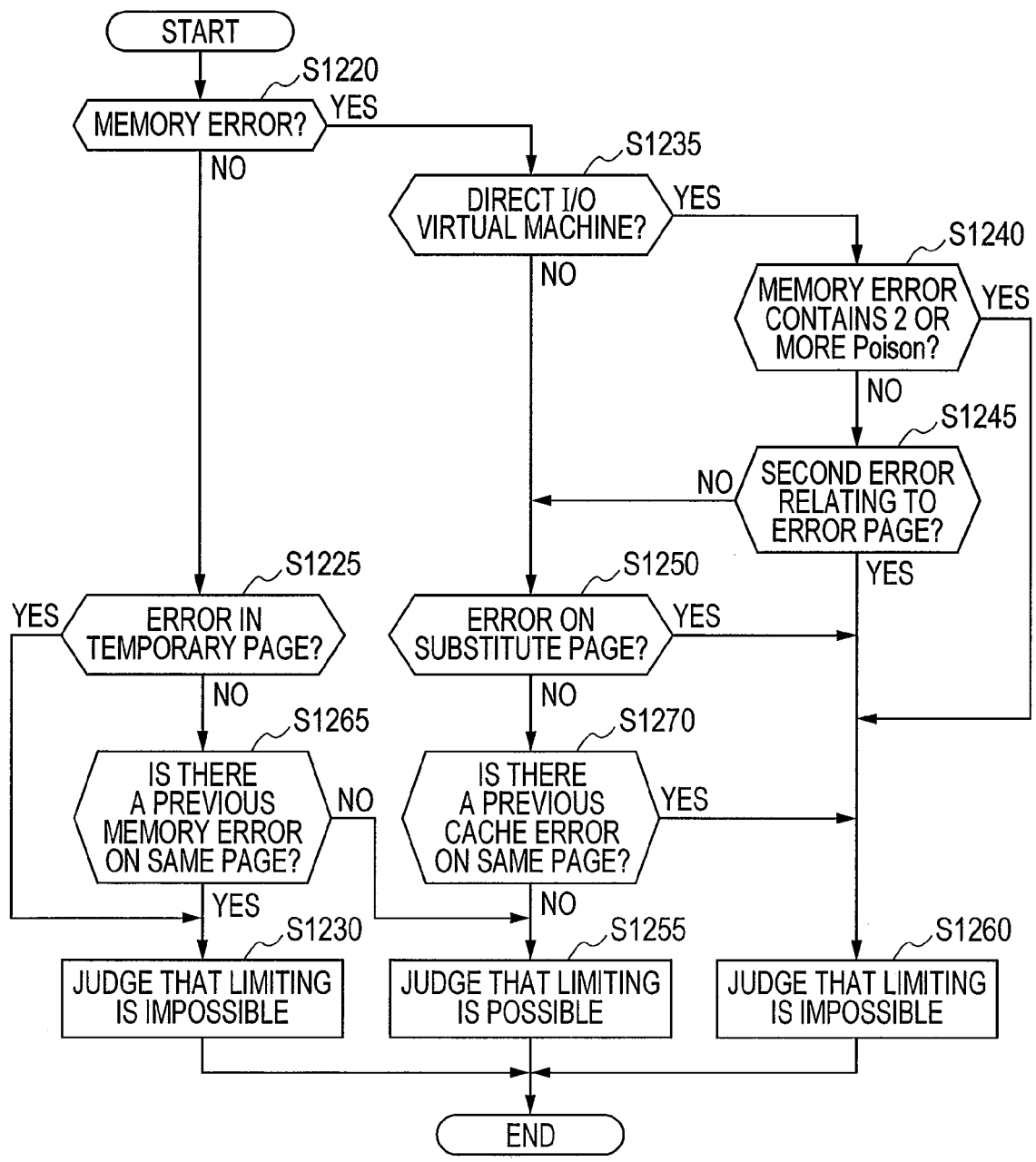
FIG. 13 is a flowchart for describing the judgment processing for allowing or prohibiting the limiting of the error effect range executed in S1110 of the embodiment of this invention.

FIG. 13 is a flowchart for describing the judgment processing to permit or prohibit the limiting of the error effect range executed in S1110 of the embodiment of this invention.

In order to simplify the equipment of this embodiment, the detection of FALSE DUE for errors grouped as dual failures (or dual errors) is abandoned, and normal operation of the virtual machine 30 is quit at the point in time the error is detected. In other words, a dual failure will stop the virtual machine 30.

The hypervisor 20 decides whether or not the error that occurred is a memory error (S1220). Namely the hypervisor 20 branches the processing according to the type of error that occurred.

If decided that the error that occurred is a memory error, then the hypervisor 20 further decides whether or not the virtual machine 30 assigned by the memory 90 where the error occurred is a direct I/O virtual machine 30 or not (S1235). The hypervisor 20 in other words, branches the processing according to the type of virtual machine 30 assigned by the memory 90 where the error occurred.

If decided that the virtual machine 30 assigned by the memory 90 where the error occurred is a direct I/O virtual machine 30, then the hypervisor 20 confirms the number of Poison that occurred in the memory 90, and decides whether or not the memory error includes two or more Poison (S1240).

If decided that the memory error includes two or more Poison, then no FALSE DUE is detected in the present embodiment, so the hypervisor 20 decides that limiting the error effect range is impossible (S1260) and terminates the process.

If decided that the memory error includes only one Poison, or in other words that the region size of the Poison is 8 bytes, then the hypervisor 20 searches the Poison table 230 and further decides whether or not a second error has occurred on the page already judged as the error page 160 (S1245).

If decided that a second error has occurred on the page already judged as the error page 160, then the hypervisor 20 proceeds to S1260, decides that limiting the error effect range is impossible and terminates the process.

If decided that the virtual machine 30 is the indirect I/O virtual machine 30 in step 1235, or decided in S1245, that a second error has not occurred on the page already judged as error page 160, then the hypervisor 20 searches the Poison table 230, and decides whether or not a further error has occurred on a page already judged as the substitute page 140 (S1250).

If decided that an error has occurred on the page already judged as the substitute page 140, then the hypervisor 20 proceeds to S1260, decides that limiting the error effect range is impossible and terminates the process.

If decided that no further error has occurred on the page already judged as the substitute page 140, then the hypervisor 20 searches the Poison table 230, and decides whether or not there is a previous cache error on the page where the Poison occurred (S1270).

If decided that there was a previous cache error on the page where the Poison occurred, the hypervisor 20 proceeds to S1260, decides that limiting the error effect range is impossible and terminates the process.

If decided that there was no previous cache error on the page where the Poison occurred, then the hypervisor 20 decides that limiting the error effect range is possible (S1255) and terminates the process.

In S1220, if decided that the error that occurred is a cache error, then the hypervisor 20 searches the Poison table 230, and decides whether or not a further error has occurred on the page already set as the temporary page 150 (S1225).

If decided that a further error has occurred on the page set as the temporary page 150, then the hypervisor decides that limiting the error effect range is impossible (S1230) and terminates the process.

If decided that no further error has occurred on the page set as the temporary page 150, then the hypervisor 20 searches the Poison table 230, and decides whether or not there is a previous memory error on the page where the Poison occurred (S1265).

If decided that there was a previous memory error on the page where the Poison occurred, the hypervisor 20 proceeds to S1230, decides that limiting the error effect range is impossible and terminates the process.

If decided that there was no previous memory error on the page where the Poison occurred, then the hypervisor 20 proceeds to S1255, decides that limiting the error effect range is possible and terminates the process.

Processing for Reading the Error Page

Figure 14:
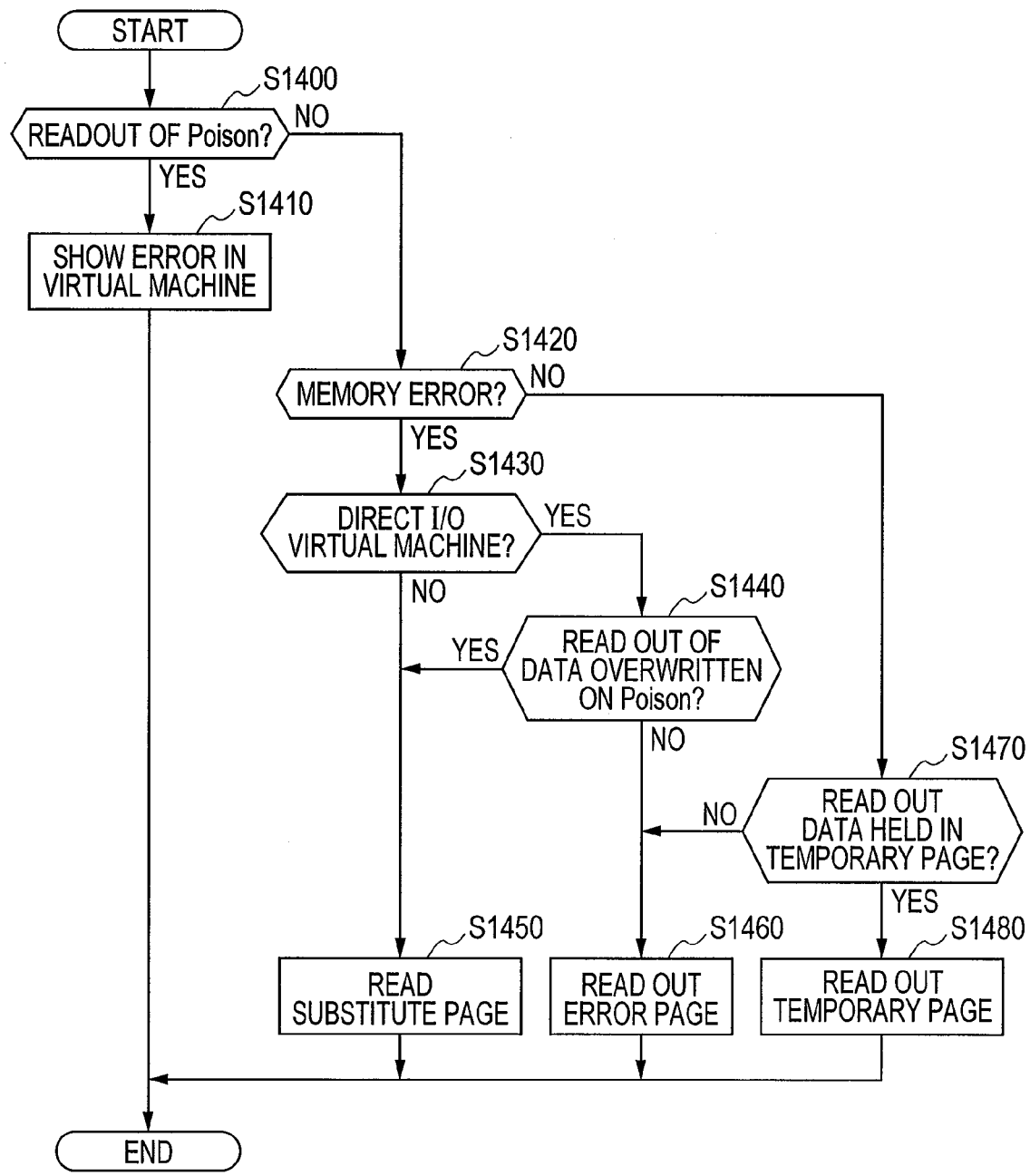
FIG. 14 is a flowchart for describing processing for handling readout of the memory protect region executed in S1050 of the embodiment of this invention.

FIG. 14 is a flowchart for describing the processing for handling readout of the protect region of the memory 90 executed in S1050 of the embodiment of this invention.

The hypervisor 20 decides whether or not the guest 40 is attempting to read out the Poison data not overwritten by the update data 720 (S1400).

More specifically, the hypervisor 20 searches the Poison table 230 and inspects in byte units, the access pattern to the memory address that the guest 40 is attempting to read out. If the bytes with a "1" in the Poison bitmap 460, and "0" in the elimination bitmap 470 are included in the memory address where the guest 40 attempted read out; then the hypervisor 20 decides that the guest 40 is attempting to read out Poison 700 not overwritten by the update data 720.

If decided that the guest 40 is attempting to read out update data 720 not overwritten by Poison 700 then the hypervisor 20, shows the error effect (S1410) into the virtual machine 30 operated by the guest 40 attempting to read the Poison 700, and terminates the process. The method for showing the effects may be shutting down the virtual machine or may be conveying the error break-in (interrupt) to the guest 40.

If decided that the guest 40 is attempting to read out data other than the Poison 700 (normal data 710 or update data 720) then the hypervisor 20 decides that the error that occurred was a memory error (S1420). Namely, the hypervisor 20 branches the processing according to the type of error. Branching the processing is performed because there are different pages storing data other than the Poison 700, according to the type of error that occurred (See FIG. 8A-FIG. 8C, FIG. 9A-FIG. 9C, and FIG. 10A-FIG. 10C).

If decided that the error that occurred was a memory error, then the hypervisor 20 decides whether or not the virtual machine 30 is a direct I/O virtual machine 30 (S1430). The hypervisor 20 in other words branches the processing according to the type of virtual machine 30 assigned by the memory 90 where the error occurred. Branching the processing is performed because there are different pages storing data other than the Poison 700 among the direct I/O virtual machine 30 and the indirect I/O virtual machine 30 (See FIG. 8A-FIG. 8C, FIG. 9A-FIG. 9C).

If decided that the virtual machine 30 is an indirect I/O virtual machine 30, then normal data 710 and the update data 720 are both present in the substitute page 140 (See FIG. 9A-FIG. 9C), so the hypervisor 20 reads out the substitute page 140 in response (S1460) and terminates the process.

If decided that the virtual machine 30 is a direct I/O virtual machine 30, then the hypervisor 20 decides whether or not the read out data is data (update data 720) overwritten among the Poison (S1440). This decision is made because the direct I/O virtual machine 30 stores the normal data 710 and the update data 720 on separate pages (See FIG. 8A-FIG. 8C).

More specifically, the hypervisor 20 searches the Poison table 230 and inspects in byte units, the access pattern for the memory address the guest 40 attempted to read out. If a byte "1" in the Poison bitmap 460, and a byte "1" in the elimination bitmap 470 are read out then this result signifies read out of the update data 720 so the hypervisor 20 decides that the read out is data (update data 720) overwritten among the Poison.

If decided this is the read out of overwritten data (update data 720) among the Poison in the loaded data then the hypervisor 20 reads out the substitute page 140 where the update data 720 is stored as a response (S1450) and terminates the process.

If there is data other than overwritten data (update data 720) among the poison or namely, if the byte read out from the Poison bitmap 460 is "0", then this byte signifies a normal readout, so the hypervisor 20 reads out the error page 160 storing the normal data 710 for the direct I/O virtual machine 30 in response (S1460) and terminates the process.

In S1420 when the error that occurred is decided to be a cache error, the hypervisor 20 decides whether or not this is reading of the update data 720 temporarily stored in the temporary page 150 (S1470). This decision is made because in the case of a cache error the normal data 710 and the update data 720 are stored in separate pages (See FIG. 10A-FIG. 10C).

More specifically, the hypervisor 20 searches the Poison table 230 and inspects in byte units the access pattern to the memory address that the guest 40 is attempting to read out. The hypervisor 20 inspects whether or not there is a byte with "0" in the elimination bitmap 470 only in the case where a byte with "1" is read out in the Poison bitmap 460 and a byte "1" from the elimination bitmap 470, and; and further in the case of an eight bytes (addresses 8n to 8n+7) array including the applicable address.

If the applicable conditions are satisfied, then the hypervisor 20 decides there is read out of the update data 720 stored temporarily in the temporary page 150.

If decided that there is no read out of the update data 720 stored temporarily in the temporary page 150, then the hypervisor 20 proceeds to S1460, reads out the error page 160 storing the normal data 170 for the direct I/O virtual machine 30 in response, and terminates the processing.

If decided that there is read out of the update data 720 stored temporarily in the temporary page 150, the hypervisor 20 reads out the temporary page 150 in response (S1480), and terminates the processing.

The read out update data 720 stored temporarily in the temporary page 150, is read out update data 720 or the normal data 710 stored in the error page 160, then the hypervisor 20 reads out (reads out) the error page 160 where the normal data 710 is stored for the direct I/O virtual machine 30 and replies.

Processing when an I/O error is detected

Figure 15:
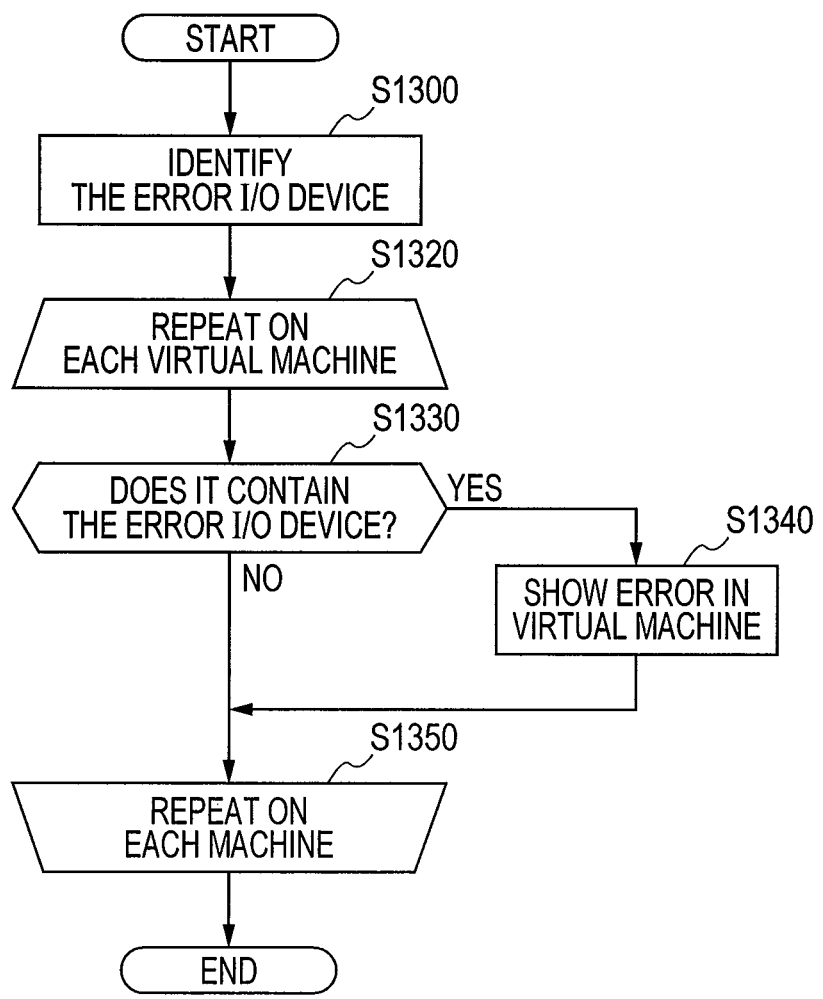
FIG. 15 is a flowchart for describing processing for handling I/O device error executed in S1070 of the embodiment of this invention.

FIG. 15 is a flowchart for describing the processing executed in S1070 for handling I/O device errors in the embodiment of this invention.

The hypervisor 20 analyzes the error information acquired from the I/O device 60 and specifies the I/O device 60 where the error was detected (S1300).

The processing from S1320 to S1350 is repeatedly performed for each virtual machine 30.

The hypervisor 20 searches the I/O assignment table 200, and decides whether or not it is the virtual machine 30 to which the I/O device 60 where the error was detected is assigned (S1330).

If decided that it is the virtual machine 30 in which the I/O device 60 where the error was detected was assigned, then the hypervisor 20 shows the effects of the error in the virtual machine 30. The means for showing the effects may be a shutdown of the virtual machine 30, or conveying the error break-in (interrupt) to the guest.

If decided as not the virtual machine 30 in which I/O device 60 where the error was detected was assigned then the hypervisor 20 decides whether or not processing was completed on all the virtual machines, and terminates the processing when completed on all the virtual machines.

Processing in Response to Writing in the Error Page

Figure 16:
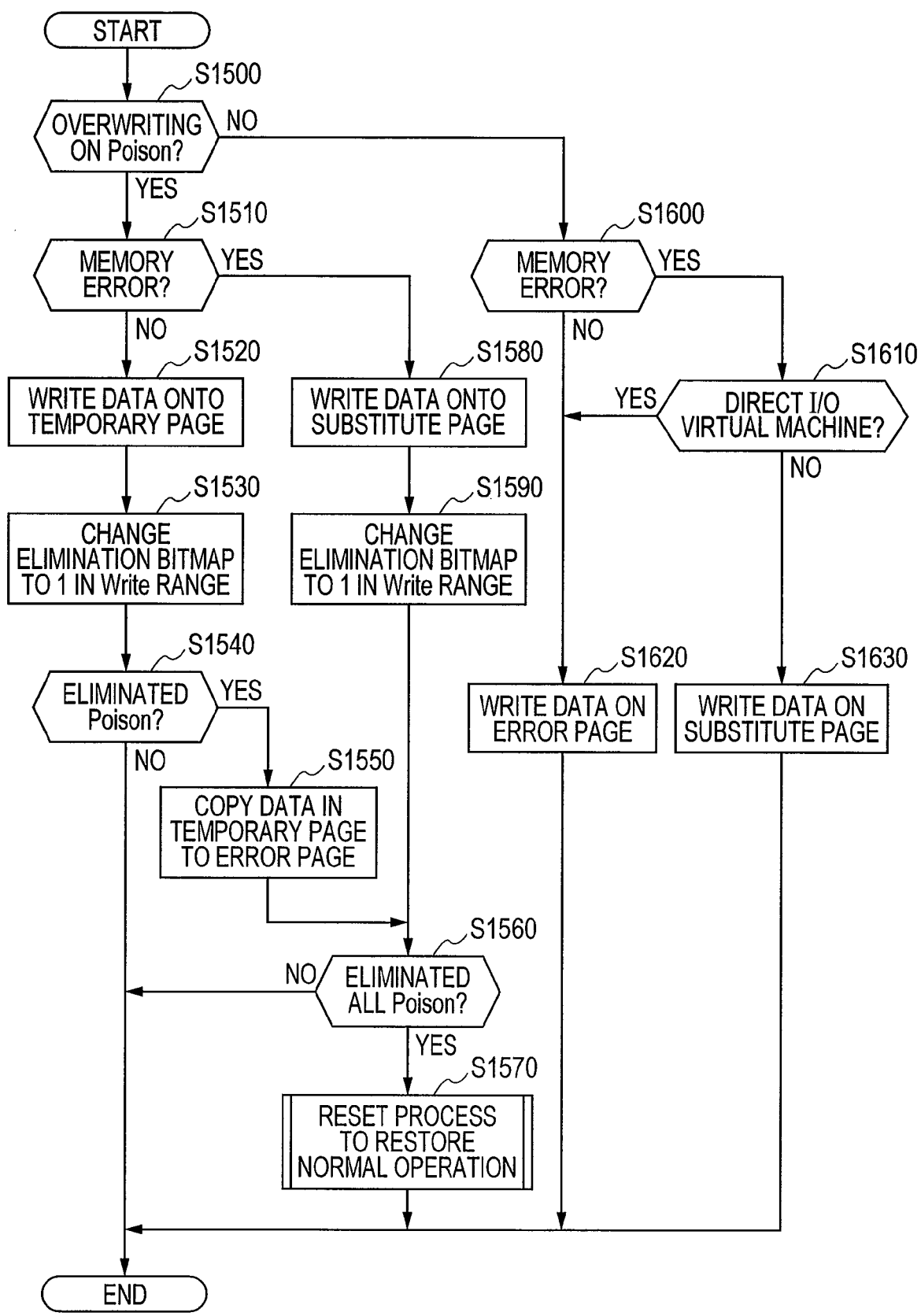
FIG. 16 is a flowchart for describing processing in response to writing in the protect region executed in S1060 of the embodiment of this invention.

FIG. 16 is a flowchart for describing the processing in response to writing in the protect region executed in S1060 of the embodiment of this invention.

The hypervisor 20 decides whether or not the guest 40 is attempting to write data on the Poison 700 (S1500). The hypervisor 20 in other words judges whether or not there is writing of the update data 720.

More specifically, the hypervisor 20 searches the Poison table 230 and inspects in byte units, the access pattern of the memory address that the guest 40 is attempting to write in. The hypervisor 20 decides there is writing in the Poison 700 if there is a "1" in the Poison bitmap 460 and a "0" in the elimination bit 470.

If decided that the guest 40 is attempting to write data on the Poison 700 then the hypervisor 20 decides whether or not the error that occurred is a memory error (S1510). Namely, the hypervisor 20 branches the processing according to the type of error that occurred. The processing is branched because there are different pages storing the update data 720 (See FIG. 8A-FIG. 8C, FIG. 9A-FIG. 9C, and FIG. 10A-FIG. 10C).

If the error that occurred is decided to be a cache error (See FIG. 10A-FIG. 10C) then the hypervisor 20 stores the update data 720 the guest 40 is attempting to write in the temporary page 150 in order to allow updating the bite units in the Poison 700 (S1520).

The hypervisor 20 changes the elimination bitmap 470 in Poison table 230 to a "1" in the memory address range written by the guest 40 (S1530).

The hypervisor 20 decides whether or not the Poison 700 was eliminated (S1540). In other words, the hypervisor 20 decides whether or not all of the Poison was overwritten.

In S1540, when the page internally contains plural Poison 700, the hypervisor 20 decides the Poison 700 was eliminated when the first Poison 700 was eliminated.

More specifically, the hypervisor 20 searches the elimination bitmap 470, and inspects the eight bits of overwritten Poison 700 by one byte each. If the eight bytes are all eliminated for the first time (applicable bits in the elimination bitmap 470 are all "1") due to writing by the guest 40, then the hypervisor 20 decides the Poison 700 was eliminated.

If decided the Poison 700 was not eliminated, then the hypervisor 20 terminates the processing.

If decided the Poison 700 was eliminated, the hypervisor 20 copies the update data 720 stored in the temporary page 150 for the eliminated Poison (S1550) into the error page 160. This processing corresponds to that in FIG. 10C.

The hypervisor 20 decides whether or not all of the Poison 700 within the page was eliminated (S1560).

More specifically, the hypervisor 20 searches the Poison bitmap 460 and the elimination bitmap 460, and inspects the entire page. If the Poison bitmap 460 and the elimination bitmap 460 are a match, then the hypervisor 20 decides that writing by the guest 40 has eliminated all the Poison 700 within the page.

If decided that not all of the Poison 700 within the page was eliminated then the hypervisor 20 terminates the processing.

If decided that all the Poison 700 within the page was eliminated, then the hypervisor 20 executes processing such as changing the memory map or canceling the memory protection to end the failure processing (S1570), and terminates the processing.

In S1510, if decided that the error that occurred is a memory error then the hypervisor 20 writes the update data 720 that the guest 40 is attempting to write, into the substitute page 140 in order to avoid writing onto a page that is not reliable due to containing the Poison 700 (S1580). Namely in case of a memory error, the update data 720 for the direct I/O virtual machine 30 and the indirect I/O virtual machine 30 is stored in the substitute page 140 (See FIG. 8B and FIG. 9B).

The hypervisor 20 changes the elimination bitmap 470 in the Poison table 230 to a "1" in the memory address range written by the guest 40 (S1590), and proceeds to S1560.

In S1500, when decided that the guest 40 is attempting to write normal data 710, the hypervisor 20 decides whether or not the error that occurred is a memory error (S1600). The hypervisor in other words branches out the processing according to the type of error that occurred. The reason is that the normal data 710 is written on different pages according to the type of error that occurred.

If decided that the error that occurred is a memory error, then the hypervisor 20 decides whether or not the virtual machine 30 is the direct I/O virtual machine 30 (S1610). Namely, the hypervisor 20 branches the processing according to the type of virtual machine 30. The reason the processing is branched out is because the normal data 710 is written on different pages for the direct I/O virtual machine 30 and the indirect I/O virtual machine 30 (See FIG. 8A-FIG. 8C and FIG. 9A-FIG. 9C).

If decided that the virtual machine 30 is the direct I/O virtual machine 30, then the hypervisor 20 writes the normal data 710 the guest 40 is attempting to write, in the stored error page 160 (S1620), and terminates the processing (FIG. 8A-FIG. 8C).

If decided that the virtual machine 30 is the indirect I/O virtual machine 30, then the hypervisor 20 writes the normal data 710 that guest 40 is attempting to write, into the substitute page 140 (S1630), and terminates the processing (See FIG. 9A-FIG. 9C).

In S1600, when decided that the error that occurred is a cache error, then the hypervisor 20 proceeds to S1620, and writes the normal data 710 that the guest 40 is attempting to write, into the error page 160, and terminates the processing (See FIG. 10A-FIG. 10C).

Figure 17:
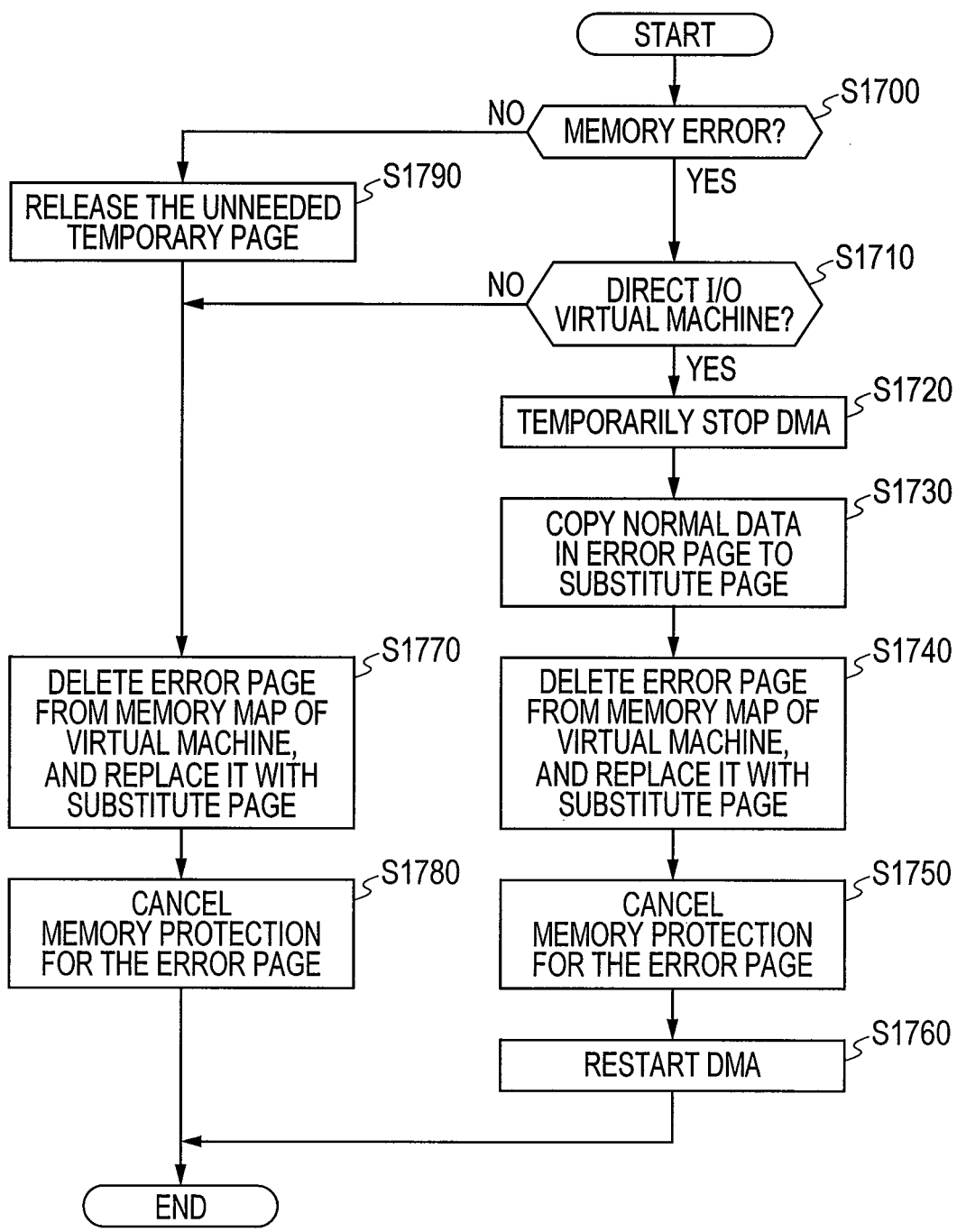
FIG. 17 is a flowchart for describing the processing executed in S1570 to restore the normal operation of the embodiment of this invention.

FIG. 17 is a flowchart for describing the processing executed in S1570 to restore the normal operation of the embodiment of this invention.

The hypervisor 20 decides whether or not the error that occurred is a memory error (S1700). The hypervisor 20 in other words branches the processing according to the type of error that occurred.

If decided that the error that occurred is a memory error then the hypervisor decides whether or not the virtual machine 30 is the direct I/O virtual machine 30 (S1710). Namely, the hypervisor 20 branches the processing according to the type of virtual machine 30. The processing is branched because the memory map is different after recovery from the error. (See Tables 2-4, FIG. 8C and FIG. 9C, and FIG. 10C.).

If decided that the virtual machine 30 is the direct I/O virtual machine 30, then in S1720-S1760, the hypervisor 20 uses the DMA pause function 117 to temporarily stop access to the guest memory 320 from the I/O device 60 and changes the data in the memory 90 and the memory map & protection table during the period that access is stopped.

More specifically, the hypervisor 20 uses the DMA pause function 117 to temporarily stop DMA of the guest memory 320 from the I/O device 60 (S1720).

The hypervisor 20 then copies the normal data 710 contained in error page 160, into the substitute page 140 (S1730).

The hypervisor 20 changes the settings in the CPU memory map & protection table 250 and the I/O memory map & protection table 260, and assigns the substitute page 140 instead of the error page 160 (S1740).

The hypervisor 20 then changes the settings in the CPU memory map & protection table 250, and cancels the memory protection by the access prohibit settings that were applied to the error page 160 (S1750).

The hypervisor 20 then restarts. DMA by cancelling the previously set DMA stoppage (S1760) and terminates the processing.

In S1700, when decided that the error that occurred is a cache error, the hypervisor 20 releases the no longer needed temporary page 150 along with elimination of all the Poison (S1790).

The hypervisor 20 changes the settings in the CPU memory map & protection table 250 and the I/O memory map & protection table 260, and assigns the substitute page 140 instead of the error page 160 (S1770).

The hypervisor 20 then changes the settings in the CPU memory map & protection table 250, and cancels the memory protection by the access prohibit settings that were applied to the error page 160 (S1780) and terminates the processing.

Conclusion

In the embodiment of the present invention, the hypervisor 20 monitors the memory reading and writing by the guest 40 and is capable of identifying between a TRUE DUE where the guest 40 reads out Poison, and a FALSE DUE where the guest 40 does not read out Poison. Moreover, the hypervisor 20 stops the operation of the guest 40 just prior to read out and so can avoid a system stoppage even after an actual TRUE DUE. Further, if a FALSE DUE by the guest writing was verified then the monitoring can be canceled and the guest operation resumed so that operation of the VM and application can continue. These effects rendered by the present invention can therefore limit the error effect range in the Xeon CPU that is normally vulnerable to system stoppages when Poison is read out.

What is claimed is:

1. A failure management method for a computer including a processor, and a memory connected to the processor,
   the processor having a memory protection function to prohibit access to a specified address in the memory, and operating a first software program stored in the memory and a second software program stored in the memory to monitor operation of the first software program, and
   the second software program retaining error information including address information on the memory address where the error occurred, and access-related information on the access state of the address,
   the method comprising the steps of:
   (1) detecting, by the second software program, an error occurring in the memory;
   (2) adding, by the second software program, the memory address where the error occurred to the error information;
   (3) prohibiting, by the second software program, access to the memory where the error occurred by changing the settings on the memory protection function, and monitoring the access state to the memory address where the error occurred;
   (4) executing, by the second software program, failure processing when access is detected by the first software program to the memory address where the error occurred,
   wherein the step (4) further includes the steps of:
   (5) deciding whether or not the access to the memory address where the error occurred by the first software program is reading out the memory address where the error occurred, or is writing in the memory address where the error occurred; and
   (6) deciding the access state of the address detected in the reading out by the first software program based on the error information when the access by the first software program is reading out the memory address where the error occurred; and
   (7) executing the failure processing based on the decision results.

2. The failure management method according to claim 1, wherein the access-related information contained in the error information storing either a first access information indicating there was writing in the memory address where the error occurred or a second access information indicating there was no writing in the memory address where the error occurred, and
   wherein the step (2) further includes the step of:
   (8) adding the second access information along with the memory address where the error occurred to the error information,
   wherein the step (4) further includes the step of:
   (9) changing the access-related information from the second access information to the first access information when deciding that access by the first software program was writing in the memory address where the error occurred,
   wherein the step (6) further includes the step of:
   (10) deciding whether or not the access-related information is the first access information or the second access information; and
   wherein the step (7) further includes the step of:
   (11) executing the failure processing based on the access-related information being the second access information.

3. The failure management method according to claim 2, wherein the step (9) further includes the steps of:
   (12) retaining data written in the memory address where the error occurred; and
   (13) allowing access by the first software program to the memory address when the access-related information is the first access information, by changing the settings of the memory protection function.

4. The failure management method according to claim 1, the memory including a first memory region utilized by the first software program, and a second memory region utilized when executing the failure processing,
   wherein the step (2) further includes the step of:
   (14) assigning the second memory region to the first software program.

5. The failure management method according to claim 4, wherein the step (2) further includes the step of:
   (15) storing the data stored in the first memory region into the second memory region.

6. A computer including a processor, and a memory connected to the processor,
   wherein the processor contains a memory protection function to prohibit access to a specified address in the memory, and executes a first software program stored in the memory and a second software program stored in the memory to monitor operation of the first software program,
   wherein the processor detects errors occurring in the memory by executing the second software program, and retains error information including address information on the memory address where the error occurred, and access-related information on the access state of the address,
   wherein the processor adds the memory address where the error occurred to the error information by executing the second software program, and
   wherein the processor prohibits access to the memory where the error occurred by executing the second software program by changing the settings on the memory protection function, and monitors the access state to the memory address of the memory where the error occurred, wherein the processor executes the failure processing when detecting access by the first software grogram to the memory address where the error occurred, wherein the processor decides whether or not the access by the first software grogram is a readout of the memory address where the error occurred or writing of the memory address where the error occurred when the access by the first software program to the memory address where the error occurred is detected, wherein the processor decides the access state of the address where readout by the first software program was detected based on the error information when the processor decides that the access by the first software program of the memory address where the error that occurred was readout, and wherein the processor executes failure processing based on the decision results.

7. The computer according to claim 6, wherein the processor stores either a first access information indicating there was writing in the memory address where the error occurred, or a second access information indicating there was no writing on the memory address where the error occurred, in the access-related information contained in the error information;

wherein the processor adds the second access information to the access-related information for the applicable memory address by executing the second software program, when adding the memory address where the error occurred;

wherein the processor changes the access-related information from a second access information to a first access information when deciding that the access by the first software program to the memory address where the error occurred, was writing;

wherein the processor decides whether the access-related information is either the first access information or the second access information, when deciding that the access state of the address where readout by the first software program was detected; and wherein the processor executes the failure processing based on the access-related information being the second access information.

8. The computer according to claim 7, wherein the processor retains data written in the memory address where the error occurred when decided that the access by the first software program of the memory address where the error occurred was writing, and wherein the processor changes the settings of the memory protection function to allow access by the first software program to the memory address when the access-related information is the first access information.

9. The computer according to claim 6, wherein the memory includes a first memory region utilized by the first software program, and a second memory region utilized when executing the failure processing; and wherein the processor executes the second software program to assign the first software program to the second memory region after adding the memory address where the error occurred.

10. The computer according to claim 9, wherein the processor executes the second software program to store the data stored in the first memory region into the second memory region after adding the memory address of the memory where the error occurred to the error information.

* * * * *